(12) United States Patent
Itoh

(10) Patent No.: US 6,795,460 B1
(45) Date of Patent: Sep. 21, 2004

(54) LASER DEVICE AND AN OPTICAL SIGNAL AMPLIFIER USING THEREOF

(76) Inventor: Katsuhisa Itoh, 206 Green Haitsu Morita, 2-500-1, Wadamachi, Ome-Shi, Tokyo (JP)

( * ) Notice: Subject to any disclaimer, the term of this patent is extended or adjusted under 35 U.S.C. 154(b) by 0 days.

(21) Appl. No.: 09/526,366

(22) Filed: Mar. 16, 2000

(51) Int. Cl.[7] .............................. H01S 3/30; H01S 3/04; H01S 3/091; H01S 3/09; H01S 3/08
(52) U.S. Cl. ............................ 372/34; 372/35; 372/36; 372/6; 372/70; 372/73; 372/99; 385/15; 385/32
(58) Field of Search ................................. 372/6, 34, 35, 372/36, 70, 73, 99, 66, 69; 385/15, 32

(56) References Cited

U.S. PATENT DOCUMENTS

| | | | |
|---|---|---|---|
| 3,611,179 A | * 10/1971 | Fyler .............................. 372/6 |
| 3,639,672 A | * 2/1972 | Kalfa ........................ 174/15 C |
| 4,847,843 A | 7/1989 | Byron et al. ................... 372/42 |
| 5,050,173 A | * 9/1991 | Hughes .......................... 372/6 |
| 5,136,680 A | 8/1992 | Seike et al. .................. 385/139 |
| 5,245,690 A | 9/1993 | Aida et al. ................... 385/142 |
| 5,923,694 A | 7/1999 | Culver ......................... 372/69 |

FOREIGN PATENT DOCUMENTS

| | | | | |
|---|---|---|---|---|
| JP | 10-135548 A | 5/1998 | ............. | H01S/3/10 |
| JP | 10-190097 A | 7/1998 | ............. | H01S/3/06 |

OTHER PUBLICATIONS

Michael R. Lindeburg, Engineer–in–training Reference Manual, 1998, Professional Publications, Inc., 8th edition, pp 52–6.*
Ueda, K. and A. Liu, "Future of High–Power Fiber Lasers", Laser Physics, vol. 8, No. 3, pp. 774–781, (1998).
Ueda, K., "Optical Cavity and Future Style of High–power Fiber Lasers", SPIE vol. 3267, pp. 14–22, 1998.
Snitzer, E., et al., Double–Clad, Offset Core Nd Fiber Laser, Optical Fiber Sensors, vol. 2, *1988 OSA Technical Digest Series* (Optical Society of America, Washington, D.C.), pp. 533–536, 1988.

* cited by examiner

Primary Examiner—Hoanganh Le
Assistant Examiner—Armando Rodriguez
(74) Attorney, Agent, or Firm—Woodard, Emhardt, Moriarty, McNett & Henry LLP

(57) ABSTRACT

A laser device for generating a laser beam and an optical signal amplifier using thereof for amplifying an optical signal are disclosed. The laser device comprises an optical fiber having a core portion in which a laser medium is doped and a cladding portion covering the core portion. The optical fiber is placed in a pumping light reflection portion in which an index matching oil is contained and a pumping light is confined. Alternatively, the optical fiber is bundled in a bundle portion in a pumping light reflection portion in which the pumping light is confined. The pumping light is introduced to the pumping light reflection portion from a pumping light introducing portion bundled with the laser fiber.

20 Claims, 19 Drawing Sheets

LASER DEVICE AND AN OPTICAL SIGNAL AMPLIFIER USING THEREOF

BACKGROUND OF THE INVENTION

1. Field of the Invention

The present invention relates to a laser device and an optical signal amplifier using thereof, and especially to a laser device for generating a laser beam by supplying a pumping light to laser medium of a laser fiber and an optical signal amplifier for amplifying an optical signal using thereof.

2. Description of the Prior Art

Development of a practical laser device with a high power and low cost is expected in the optical communication industry and optical machining technology.

Among the promising technologies, it is known that an optical fiber laser oscillator or an optical waveguide type laser oscillator has an advantage in that the oscillation mode can be set single when such oscillators are designed and manufactured, by adjusting the core diameter and the refractive index difference between the core and a cladding. Such oscillators can also provide a high quality laser beam spatially and efficiently because the oscillators can present a high interaction between a laser medium and the beam by intensively confining the beam, and can present a long interaction in the fiber.

Here, one problem to be solved for realizing high power or high efficiency laser beam generation is to effectively introduce the pumping light into the addition area (usually a core portion) in which luminescence center such as laser activation ions or dye or the like is added or doped.

However, when the core diameter is set in accordance with a usual single mode wave guide condition, it is limited to the addition area in which the luminescence center is doped to have a diameter not larger than 10 and several $\mu$m, which is too small to efficiently introduce the pumping light in general.

Therefore, a method is known using a device called a double cladding type fiber laser. The double cladding type fiber laser comprises a second cladding portion, outside a first cladding portion, which is made from a transparent substance having a lower refractive index than the first cladding portion. The pumping light introduced from the edge surface is confined within the first cladding portion and the core portion due to total reflection resulting from refractive index difference between the second cladding portion and the cladding portion, so that, as the confined pumping light passes through the addition area in which the luminescence center is added, the pumping light is progressively absorbed in the luminescence center, thereby to produce a high power of laser beam. (E. Snitzer, H. Po, F. Hakimi, R. Tumminelli, and B. C. McCllum, in Optical Fiber Sensors, vol.2 of 1988 OSA Technical Digest Series (Optical Society of America, Ishington D.C., 1988), paper PD5.).

However, in the double cladding type fiber laser, if the cross-sectional configuration of the inner cladding portion is circular, only the pumping light selectively passing through adjacent the addition area is effectively absorbed into the laser medium, and the absorption rate of the pumping light passing through other area is low. That is, absorption saturation occurs depending on modes.

Thus, effort is made to form the cross-sectional configuration of the inner cladding portion into rectangular. However, it is difficult in general to manufacture the fiber having other cross-sectional configurations other than circular, and such fiber tends to lack mechanical strength.

In order to resolve such problems, an optical fiber laser device (Japanese Laid-open Patent Application 10-135548) and a laser device (Japanese Laid-open Patent Application 10-190097) are proposed in which the pumping light is introduced to the addition area from lateral sides of the laser fiber.

When the pumping light is introduced from the lateral side into the addition area, the length of waveguide (L) is long compared to the diameter (d) of the addition area, resulting in $L/d > 10^6$, thus enabling to bring in a higher amount of excitation energy into the fiber or waveguide than the case where the pumping light is introduced from cross section side of the waveguide.

In the above optical fiber laser device and the laser device, the pumping light is transmitted in a manner to cross the fiber, so that it is necessary to provide a high optical quality construction with low losses at the gaps between the respective fibers. Therefore, such low loss construction is conventionally realized by embedding the fiber into an optical adhesive material.

However, when filling the gap with the optical adhesive material, it is necessary to use the optical adhesive material made of an organic substance, which is vulnerable to and easily damaged by the pumping light, that is, having low resistance against optical energy.

Further, the devices described above have a disadvantage in that efficiency for absorbing pumping light is low. This is so because, in the double cladding type fiber laser, pumping light of a mode which is able to pass through the area adjacent to the core portion where laser medium is doped is selectively absorbed, and pumping light of modes other than the pass through mode have constant and low absorption efficiencies.

SUMMARY OF THE INVENTION

Accordingly, it is an object of the present invention to provide a laser device and an optical signal amplifier using thereof which have a high optical energy resistance and are easy to manufacture.

It is also an object of the present invention to provide a laser device and an optical signal amplifier using thereof which have a high pumping light absorption efficiency.

The above object of the present invention is achieved by a laser device for generating a laser beam by supplying a pumping light to a laser medium contained in an optical fiber comprising an optical fiber having a core portion in which said laser medium is added and a cladding portion covering said core portion, a fluid medium having a refractive index substantially identical to said cladding portion at a wavelength of said pumping light, a pumping light reflecting portion having an inner space filled with said fluid medium and containing at least a part of said optical fiber thereby to confine said pumping light interiorly thereof, and a laser beam introducing port for introducing said pumping light into said pumping light reflecting portion, wherein said pumping light reflecting portion comprises a part of a passage for said fluid medium.

According to the present invention, the laser device comprises a pumping light reflecting portion installing a sufficiently long optical fiber and a fluid medium, and the fluid medium has a refractive index substantially identical to the outer periphery of the optical fiber, therefore, a laser device which is easy to manufacture and highly efficient can be realized.

Furthermore, the fluid medium flows so that deterioration of the medium due to heat generation can be suppressed thereby to realize a laser device having a high anti-optical power resistance.

The above object of the present invention is also achieved by an optical signal amplifier for amplifying an optical signal by supplying a pumping light to a laser medium contained in an optical fiber comprising an optical fiber having a core portion in which said laser medium is doped and a cladding portion covering said core portion, a fluid medium having a refractive index substantially identical to said cladding portion at a wavelength of said pumping light, a pumping light reflecting portion having an inner space filled with said fluid medium and containing at least a part of said optical fiber thereby to confine said pumping light interiorly thereof, and a laser beam introducing port for introducing said pumping light into said pumping light reflecting portion, wherein said pumping light reflecting portion comprises a part of a passage for said fluid medium.

According to the above invention, the optical signal amplifier comprises a pumping light reflecting portion installing a sufficiently long optical fiber and a fluid medium, and the fluid medium has a refractive index substantially identical to the outer periphery of the optical fiber, therefore, an optical signal amplifier which is easy to manufacture and highly efficient can be realized.

The above object of the present invention is also achieved by a laser device for performing a laser oscillation by using an optical fiber, said optical fiber having a core in which a laser medium is doped and a cladding covering said core, said laser device comprising an optical fiber bundle in which said optical fiber forming at least one optical path is bundled, a pumping light introducing portion for introducing pumping light for pumping said laser medium in said optical fiber, said pumping light introducing portion being bundled together with said optical fiber in said optical fiber bundle, a pumping light reflection portion covering at least a part of a side surface of said optical fiber bundle for repeatedly reflecting the pumping light so that said pumping light is absorbed in said laser medium, and a laser output portion for outputting a laser beam generated by said laser medium pumped by said pumping light.

According to the above invention, the laser device comprises a pumping light reflection portion covering the optical fiber bundle comprising an optical fiber, and a pumping light introducing portion for introducing pumping light for pumping the laser medium into the optical fiber bundle, thus introduced pumping light is repeatedly reflected at the pumping light reflection portion and is absorbed in the laser medium, therefore, the absorption rate of pumping light is increased to improve the oscillation efficiency.

The above object of the present invention is also achieved by an optical signal amplifier for amplifying an optical signal by using an optical fiber, said optical fiber having a core in which a laser medium is doped and a cladding covering said core, said optical signal amplifier comprising an optical fiber bundle in which said optical fiber forming at least one optical path is bundled, a pumping light introducing portion for introducing pumping light for pumping said laser medium in said optical fiber bundle, said pumping light introducing portion being bundled together with said optical fiber bundle, a pumping light reflection portion covering at least a part of a side surface of said optical fiber bundle for repeatedly reflecting the pumping light so that said pumping light is absorbed in said laser medium, and an output portion for outputting an optical signal amplified by said laser medium pumped by the pumping light.

Also, according to the above invention, the optical signal amplifier comprises a pumping light reflection portion covering the optical fiber bundle comprising an optical fiber, and a pumping light introducing portion for introducing pumping light for pumping the laser medium into the optical fiber bundle, thus introduced pumping light is repeatedly reflected at the pumping light reflection portion and is absorbed in the laser medium, therefore, the absorption rate of the pumping light is increased to improve the amplifying efficiency.

DESCRIPTION OF THE PREFERRED EMBODIMENT

The preferred embodiments of the present invention will now be described in further detail with reference to the accompanying drawings.

Figure 1:
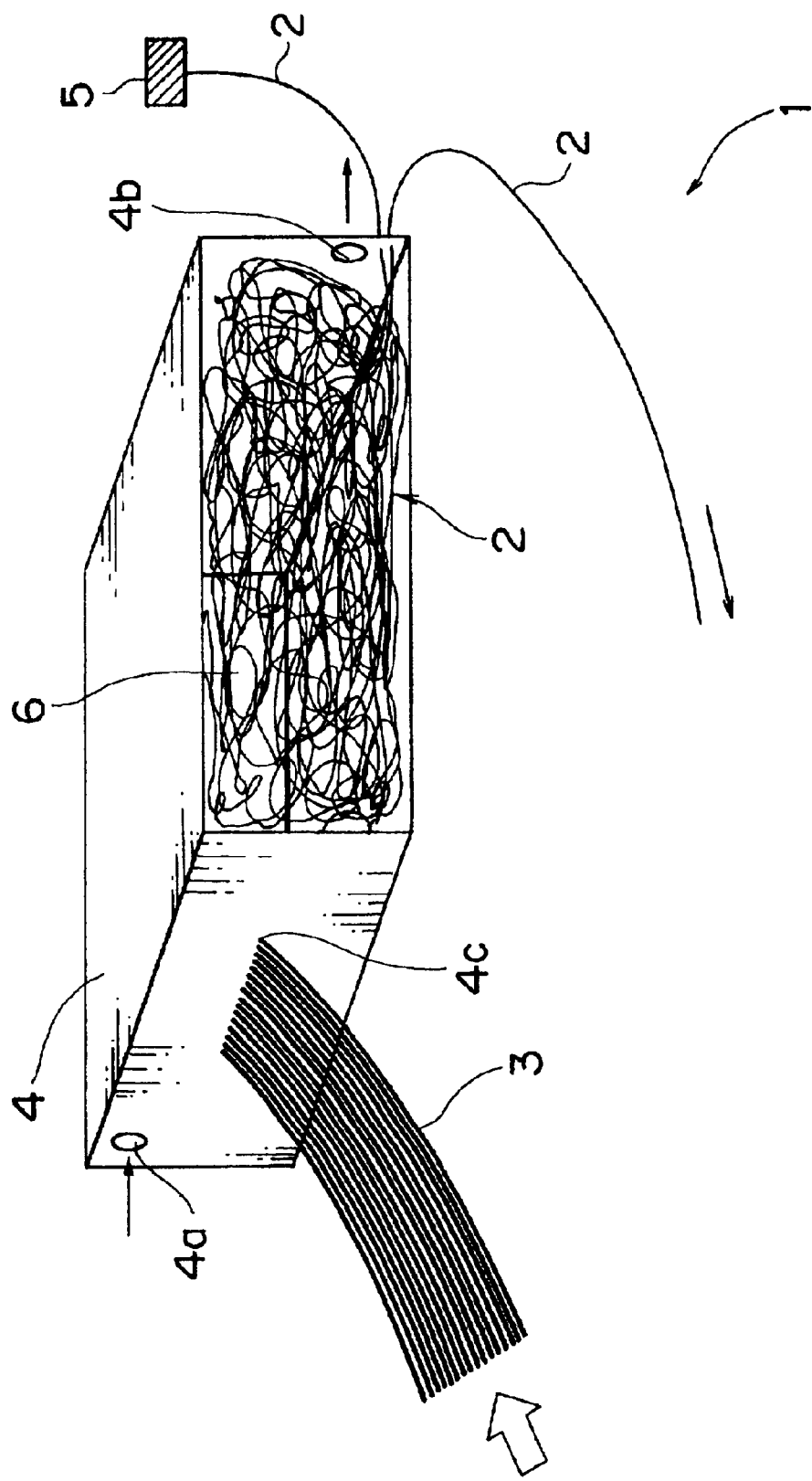
FIG. 1 is a schematic view showing an overall construction of a laser device according to a first embodiment.
Figure 2:
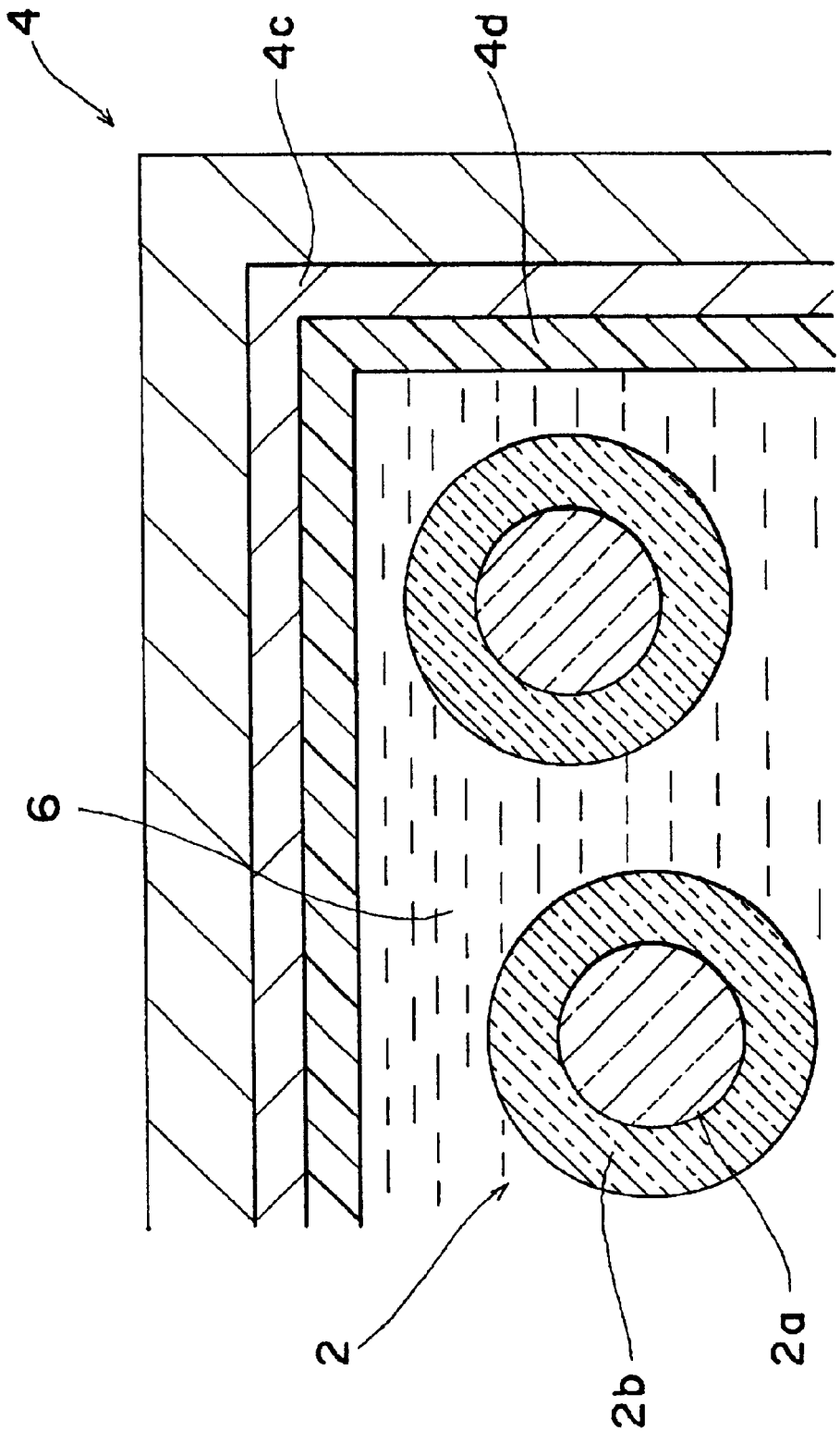
FIG. 2 is an enlarged view showing the inside of the fiber casing 4.

At first, a first embodiment of the present invention is described referring to FIGS. 1 and 2. FIG. 1 shows a construction of a laser device 1 of the first embodiment.

The laser device 1 comprises a single laser fiber 2 for generating a laser beam, a fiber casing 4 for housing a part of the laser fiber 2, a reflection mirror 5 attached to an end of the laser fiber 2, and a pumping light introducing fiber 3 for introducing a pumping light to the interior the fiber casing. The fiber casing 4 is provided with an introducing port 4a for receiving index matching oil 6 into the fiber casing 4 and a discharging port 4b for discharging the index matching oil 6 from the fiber casing 4. Thus, the index matching oil 6 is received to and discharged from the fiber casing 4.

The laser fiber 2 is housed in the fiber casing 4 and both terminal ends of the laser fiber 2 are located exterior of the fiber casing 4. One end of the laser fiber 2 outside the fiber casing 4 is attached to a reflection mirror 5.

The laser fiber 2 can be made of silica based glass or non-silica based glass. When a laser fiber is made of silica based glass, a laser device with less transmission loss can be provided. Also, the silica based glass fiber can be suitably used for a high power or high energy density oscillation because of its high melting point of more than 1700° C.

As the laser medium doped in the silica based glass fiber, $Nd^{3+}$ is most preferably used, which mainly generates a laser beam having a wavelength of 1.06 μm. Among the laser medium of rare earth elements, $Nd^{3+}$ ion has a relatively larger stimulated emission cross section, and has a lifetime of a few hundreds μs at an initial emission level, thus the silica fiber including $Nd^{3+}$ can efficiently generate a laser beam of a 1.06 μm band.

Also, as a laser oscillation of a 1.06 μm band by $Nd^{3+}$ ions doped in the silica based glass core is a four-level laser oscillation, an oscillation threshold thereof is much lower than that of a three-level laser oscillation, and thus the oscillation can be easily provided. Therefore, a silica based glass fiber in which $Nd^{3+}$ ions are doped in the core has an advantage in that the fiber has a high efficiency, a low threshold, and a high optical energy resistance.

When the laser fiber 2 is made of non-silica based glass such as fluoride glass, chalcogenide glass and telluride glass, laser oscillation of an infrared band ray can be provided due to its low multiphoton absorption, which cannot be provided by a silica based glass fiber. For example, when $Ce^{3+}$ is doped in the non-silica core, wavelength of the oscillated laser beam is 5 μm and when $Pr^{3+}$ is doped in the non-silica core, wavelength of the oscillated laser beam is 5 μm, 1.3 μm and 2.3 μm. Examples of the laser medium doped in the non-silica based glass and oscillated laser wavelengths generated thereby are as follows: $Nd^{3+}$:5 μm, 2.5 μm/$Tb^{3+}$:5 μm/$Dy^{3+}$: 3 μm, 1.34 μm, 1.7 μm/$Ho^{3+}$:5 μm, 4 μm, 3 μm, 2 μm/$Er^{3+}$:3 μm, 3.5 μm, 4 μm/$Tm^{3+}$:5.5 μm, 4 μm, 2 μm, 1.2 μm/$Eu^{3+}$:0.5–0.4 μm.

Generally, by fluoride glass, chalcogenide glass and telluride glass, a multiphoton absorption due to excited state absorption (ESA) is intense compared to the silica based glass and a frequency conversion from long wavelength to short wavelength can be realized. For example, a green laser beam by $Er^{3+}$, red, green and blue laser beams by $Pr^{3+}$, and a blue laser beam by $Tm^{3+}$, can be generated.

In the optical signal amplifier, by a fluoride glass fiber or a chalcogenide glass fiber in which $Pr^{3+}$ is doped, an optical signal of a 1.3 μm wave can be amplified, which is difficult by silica based glass fiber. By a multicomponent aluminosilicate fiber or a telluride fiber, an optical signal amplification gain in a 1.5 μm wave band is less dependent on wavelength, therefore a optical signal can be amplified in a variety of band by wavelength multiplexing of optical communication. Also, when $Yb^{3+}$, $Er^{3+}$, $Ce^{3+}$, $Tm^{3+}$ or $Ho^{3+}$, is doped as a laser medium in the non-silica glass core, the cladding can be made of silica based glass.

The pumping light introducing fiber 3 is arranged so that a terminal end extends through a pumping light introducing port 4c inside the fiber casing 4, thus, the tip of the terminal end radiates the pumping light into the fiber casing 4.

As a pumping source, a commercially available laser diode (LD) having wavelengths of 1.5 μm, 0.98 μm, 0.9 μm, 0.8 μm, 0.67 μm or the like may be utilized. A solid-state laser pumped by LD, which has a wavelength of 1.06 μm, 1.1 μm or 0.53 μm, may also be utilized.

The index matching oil 6 has substantially the same matching refractive index as the cladding layer. As an index matching oil, one having low viscosity is preferably used to improve fluidity thereof. When the optical fiber is comprised of non-silica based glass, which is easily deteriorated by water, an index matching oil with less water content is preferably used.

FIG. 2 is an enlarged cross sectional view showing the interior of the fiber casing 4. Inside the fiber casing 4, a metal plated layer 4c plated with gold or other suitable material is formed through a plating process, and a transparent cladding layer 4d comprised of fluorocarbon polymer or the like is formed.

The laser fiber 2 housed inside the fiber casing 4 is comprised of a doped core 2a for generating a laser beam initiated by the pumping light, and a cladding layer 2b surrounding the doped core 2a, thus providing a fiber having a coaxial construction comprising the central doped core 2a and the cladding layer 2b extending radially outward from the periphery of the doped core 2a. Gaps between the laser fiber 2 are filled with the index matching oil 6.

In this arrangement, the materials for the cladding layer 2b and index matching oil 6 are selected to have substantially the same refractive index to each other, and the material for the transparent cladding layer 4d is selected to have a smaller refractive index than the cladding layer 2b and index matching oil 6.

Next, operation of the laser device 1 of the first embodiment is described by referring to FIGS. 1 and 2. First, flow of the index matching oil 6 having substantially the same matching refractive index as the cladding layer 2b is described.

The index matching oil 6 pressurized by a pump or the like is impregnated or introduced inside the fiber casing 4 through the introducing port 4a. The index matching oil 6 introduced inside the fiber casing 4 fully fills the interior of the fiber casing 4 and is discharged through the discharging port 4b. Thus, within the fiber casing 4, a state is formed where the index matching oil 6 is steadily flowing.

Generally, a non-silica based glass has a lower heat resistance than a silica based glass. Thus, when the non-silica glass fiber is used, the fluidity of the index matching oil prevents the deterioration of not only the index matching oil 6 but also the non-silica glass laser fiber.

Next, operations for the laser beam generation is described.

The pumping light introduced by the pumping light introducing fiber 3 propagates forward inside the fiber casing 4 while crossing the laser fiber 2 and index matching oil 6 contained therein, and reaches the inner wall of the fiber casing 4 and is reflected by the metal plated layer 4c or the transparent cladding layer 4d. The reflected pumping light propagates inside the fiber casing 4 in the same manner to be repeatedly reflected by the metal plated layer 4c or the transparent cladding layer 4d.

A part of the pumping light crossing each fold of laser fiber 2 reaches the doped core 2a, and the doped core 2a irradiated by the pumping light generates a laser beam. The generated laser beam propagates through the laser fiber 2. Once the generated laser beam reaches the end of the laser fiber 2 provided with the reflection mirror 5, the laser beam is reflected thereby to reach the other end of the laser fiber 2 so as to be output.

Thus, in this embodiment, the fiber casing 4 housing the laser fiber 2 is filled with the index matching oil 6, and then the pumping light is introduced within the fiber casing 4 so that the introduced pumping light excites the doped core 2a of the laser fiber 2 to generate the laser beam while the pumping light is repeatedly reflected within the fiber casing 4. Therefore, the device can provide an efficient laser beam generation by a simple device construction, thereby enabling reduction of the device and production cost.

Also, the pumping light is irradiated while the index matching oil 6 is flowing. Thus, a portion of the molecules do not suffer from constant intensive irradiation of the laser beam so that anti-laser beam resistance of the index matching oil is remarkably improved. Furthermore, this construction also provides a cooling effect to the laser fiber, thereby preventing deterioration of the index matching oil accompanied by a temperature increase of the laser fiber 2.

In the above device, the cladding layer 2b of the laser fiber 2 can be coated with a polymer that is transparent at the wavelength of the pumping light and having substantially the same refractive index as the cladding layer 2b. This polymer coating is preferably made as thin as possible to improve cooling efficiency and decrease laser damage.

Next, a first example of the first embodiment is described. In the first embodiment, a silica based glass fiber having a 50 $\mu$m core diameter; a 125 $\mu$m cladding diameter; and a numerical aperture of 0.2 is used, in which $Nd^{3+}$ ions of 0.2 at % are doped inside the core, is used. Such laser fiber of 100 m length is packed inside a rectangular parallelopiped vessel of 250 mm×180 mm×30 mm, and an index matching oil having a refractive index of 1.458; and 30 poise viscosity at room temperature, which is transparent in a wavelength range of 0.5—0.85 $\mu$m, is introduced into the vessel at 1 litter/min.

This vessel is made of a transparent fluorocarbon polymer with a thickness of 0.5 mm, and the exterior surface of the polymer is coated with gold. On the side surface of the vessel on the side having 180 mm width, windows for introducing pumping light are formed equidistantly in a matrix of 20 longitudinal rows and 2 latitudinal rows, and to each of the windows is connected to a pumping light introducing fiber having a numerical aperture of 0.2, a rectangular cross section of 1.0 mm×0.3 mm and a length of 1.5 m. The other terminal end of the pumping light introducing fiber not connected to the vessel is respectively connected to a laser diode of 0.8 $\mu$m wavelength and 200 W output power by way of an optical lens.

One end of the laser fiber is perpendicularly pressed against a reflection mirror having a reflectance of 99.9%, and the other end remains a cut surface of about 4% reflectance. By introducing pumping light of 8 kW in total, laser oscillation is observed to be output from the cut end surface of the laser fiber having 1.2 kW power and 1.06 $\mu$m wavelength.

Next, a second example of the first embodiment is described. In the first embodiment, a $ZnF_4$ fluoride glass fiber having a 50 $\mu$m core diameter; a 125 $\mu$m cladding diameter; and a numerical aperture of 0.2 is used, in which $Nd^{3+}$ ions of 1 at % are doped inside the core. Such laser fiber of 50 m length is all packed inside the same rectangular parallelopiped vessel as that used in the first example, and an index matching oil having a refractive index of 1.51 and a viscosity of 30 poise at room temperature, which is transparent in a wavelength range of 0.5~0.85 $\mu$m, is introduced into the vessel at 1 litter/min.

Each of the windows of the vessel is connected to a pumping light introducing fiber having a numerical aperture of 0.2, a rectangular cross section of 1.0 mm×0.3 mm and a length of 1.5 m. The other terminal end of the pumping light introducing fiber not connected to the vessel is respectively connected to a laser diode of 0.8 $\mu$m wavelength and 100 W output power by way of an optical lens.

One end of the laser fiber is perpendicularly pressed against a reflection mirror having a reflectance of 99.9%, and the other end remained a cut surface having a reflectance of approximately 4%. By introducing pumping light of 2 kW in total, laser oscillation is observed to be output from the cut end surface of the laser fiber having 0.5 kW power and 1.05 $\mu$m wavelength.

Figure 3:
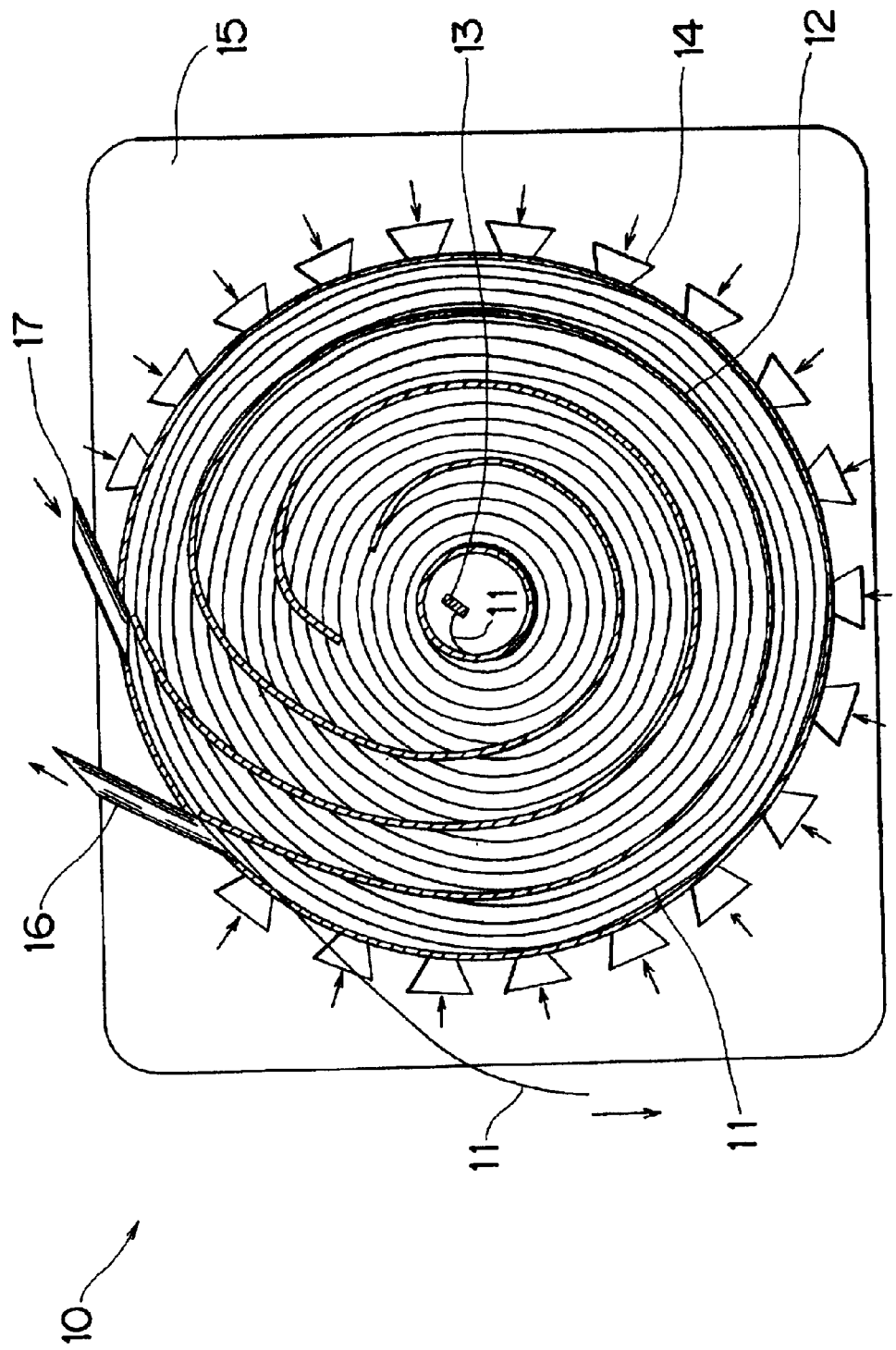
FIG. 3 is a schematic view showing an overall construction of a laser device according to a second embodiment.

Hereinafter, a second embodiment is described by referring to FIG. 3. FIG. 3 shows a construction of a laser device 10 of the second embodiment.

The laser device 10 of the embodiment comprises: a single laser fiber 11; separators 12 for smoothly flowing the index matching oil; a reflection mirror 13; pumping light LDs 14 for introducing pumping light; a metallic base 15 on which a mirror surface is plated by gold or other suitable material thereon; an introducing port 17 for introducing the index matching oil inside the metallic base 15 and a discharging port 16 for discharging the index matching oil from the metallic base 15.

Inside the metallic base 15 is provided a cylindrical space and a laser fiber 11 is spirally arranged in the space from the outer periphery to the center. On the terminal end of the laser fiber 11 located at the center of the spiral is attached a reflection mirror 13, and the other terminal end of the laser fiber 11 is drawn outside the metallic base 15. Construction of the laser fiber 11 is the same as that used in the first embodiment and further description is omitted.

On the laser fiber 11 arranged inside the metallic base 15, the separator 12 comprised of a core-less fiber, that is, a fiber 11 without the doped core, is spirally arranged without locating its terminal end at the center. The index matching oil introduced from the introducing port 17 flows along the separator 12 inside the metallic base 15 and is discharged from the discharging port 16. Here, material for the separator 12 is the same as the cladding layer of the laser fiber 11, that is, it has substantially the same refractive index as the index matching oil so as not to interfere with the propagation of the pumping light.

A plurality of pumping light LDs 14 are arranged on the side surface of the cylinder arranged inside the metallic base 15 for introducing pumping light into the cylinder. The introduced pumping light excites the laser fiber 11 to generate a laser beam while being repeatedly reflected inside the metallic base 15. The generated laser beam propagates towards both ends of the laser fiber 11, and the beam having reached the reflection mirror 13 is reflected there and is output from the other end of the laser fiber 11.

Next, a first example of the second embodiment is described. In the second embodiment, a silica based glass fiber having a 50 $\mu$m core diameter; a 125 $\mu$m cladding diameter; and a numerical aperture of 0.2, in which $Nd^{3+}$ ions of 0.2 at % are doped inside the core, is wound into a single layer spiral of an outer diameter of approximately 100 mm$\phi$, and is housed in a casing made of a gold plated metal plate. A core-less single layer silica fiber having a diameter of 100 μm is arranged as a separator on the laser fiber assembled as above. This fiber worked to smoothly flow the index matching oil. This separator is made from the same material as the cladding of the laser fiber, thus it is optically assimilated with the index matching oil when it is dipped therein so as not to interfere with the propagation of pumping light. The introducing port and discharging port are provided adjacent the end surface of the separator, and index matching oil having a refractive index of 1.458 is introduced therein at a flow rate of 0.1 litter/min.

Pumping light is generated by laser diodes having an oscillation wavelength of 0.8 μm and arranged on the metallic base 15 and around the separator 12 so as to input a total power of 2.5 kW. One end of the laser fiber is pressed against a reflection mirror having a reflectance of 99.9%, and the other end remains a cut surface. Laser oscillation having 1.0 kW power and a wavelength of 1.06 μm band is observed as a result.

Next, a second example of the second embodiment is described. In the second embodiment, a $AlF_3$—$ZrF_4$ glass fiber having a 100 μm core diameter; a 125 μm cladding diameter; and a numerical aperture of 0.2, in which $Er^{3+}$ ions of 5 at % are doped inside the core, is wound into a single layer spiral of an outer diameter of approximately 100 mmφ, and is housed in a casing made of a gold plated metal plate. A core-less single layer fiber having a diameter of 100 μm and made of $AlF_3$—$ZrF_4$ glass is arranged as a separator on the laser fiber assembled as above. The introducing port and discharging port are provided adjacent the end surface of the separator, and index matching oil having a refractive index of 1.448 is introduced therein at a flow rate of 0.1 litter/min.

Pumping light is generated by laser diodes having a pulse oscillation wavelength of 0.98 μm and arranged on the metallic base and around the separator so as to input a total power of 500 W in total. One end of the laser fiber is pressed against a reflection mirror having a reflectance of 99.9%, and the other end remains a cut surface. As a result, pulse laser oscillation having a 50 W power output on average and a wavelength of 2.8 μm band with a pulse frequency of 100 Hz is observed.

Figure 4:
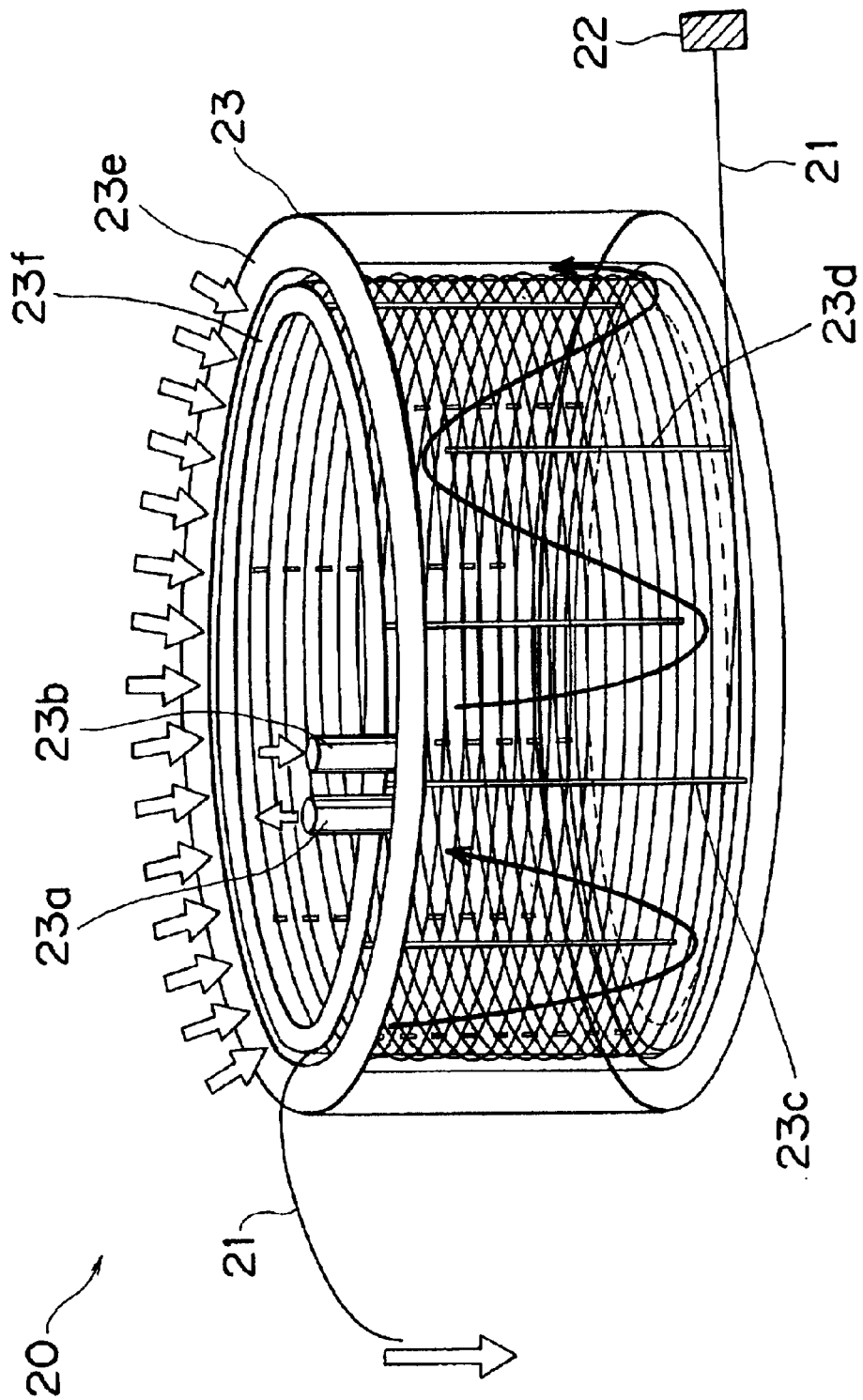
FIG. 4 is a schematic view showing an overall construction of a laser device according to a third embodiment.

Hereinafter, a third embodiment of the invention is described referring to FIG. 4. FIG. 4 shows construction of a laser device 20 of the third embodiment.

The laser device 20 of the embodiment comprises: a single laser fiber 21; a reflection mirror 22; an inner assembly 23f; an outer assembly 23e; a metallic casing 23; an introducing port 23b for introducing index matching oil into the metallic casing 23; a discharging port 23a for discharging the index matching oil from the metallic casing 23 and separation fibers 23c and 23d.

The metallic casing 23 has its inner surfaces plated with gold or other suitable material and includes an outer assembly 23e therein. Inside the outer assembly 23e is provided a cylindrical inner assembly 23f having a smaller bottom diameter than the outer assembly, and the space between the side surfaces of the outer and inner assemblies 23f and 23e is hermetically sealed by being closed at both upper and loarends by plates, comprising a gold or other suitable material plated layer further coated with a transparent polymer such as fluorocarbon polymer. The outer and inner assemblies 23f and 23e are both made of a transparent fluorocarbon polymer or the like, and the inner assembly 23f is plated with gold or other suitable material on its inner side surface.

The laser fiber 21 is arranged inside the space between the side surfaces of the inner and outer assemblies 23f and 23e by being wound around the side surface of the inner assembly 23f, and the terminal end is drawn to the outside. On one end of the laser fiber 21 is attached a reflection mirror 22, and the other end remains a cut surface.

Above the space between the side surfaces of the inner and outer assemblies 23f, 23e is provided an introducing port 23b and a discharging port 23a for circulating the index matching oil inside the space.

Inside the space are provided a plurality of separation fibers 23c and 23d. Each separation fiber 23c, 23d is arranged outside the laser fiber 21 wound around the side surface of the inner assembly 23f, and is aligned perpendicular to the bottom surface of the metallic casing 23. Each separation fiber 23c, 23d has a similar diameter as the width of the gap between the side surfaces of the inner and outer assemblies 23f and 23e, therefore, it constructs an index matching oil flow passages by being arranged equidistantly between the inner and outer assemblies 23f, 23e.

One separation fiber 23c, among a plurality of separation fibers 23c, 23d, arranged between the introducing port 23b and discharging port 23a has the same length as the height of the inner and outer assemblies 23f and 23e, thereby dividing the space into a region where introducing port 23b is connected and a region where discharging port 23a is connected.

The length of other separation fiber 23d is shorter than the separation fiber 23c for providing a gap for passing the index matching oil therethrough. These separation fibers 23d are arranged to alternately abut one end to the upper or loarend surface of the space between the inner and outer assemblies 23f and 23e. Thus, if a separation fiber 23c is arranged to abut one end with the upper end of the space, then the next separation fiber 23d is arranged to abut its one end with the loarend of the space, and the next separation fiber 23d is arranged vise-versa. By such arrangement, the index matching oil flows along the side surfaces of the inner and outer assemblies 23f and 23e meanderingly to up and down.

Here, the separation fibers 23c, 23d are made of the same material as the cladding of the laser fiber 21, so as to have substantially the same refractive index as the index matching oil so as not to interfere with the propagation of the pumping light.

Pumping light is irradiated from above the space between the inner and outer assemblies 23f and 23e, and the irradiated pumping light excites the laser fiber 21 while repeatedly reflecting inside the space and the generated laser beam is output from the end opposite to the reflection mirror 22.

Next, a first example of the third embodiment is described. In the third embodiment, a silica based glass fiber having a 50 μm core diameter; a 125 μm cladding diameter; and a numerical aperture of 0.2, in which $Nd^{3+}$ ions of 0.2 at % are doped inside the core, is wound in a single layer around a side surface of a cylinder having an outer diameter of 100 mmφ. The cylinder is made of a transparent fluorocarbon polymer, and is plated with gold on its inner surface. A core-less single layer silica fiber having a diameter of 100 μm is arranged as a separator outside the laser fiber wound as shown in FIG. 4. This fiber worked to smoothly flow the index matching oil. This separator is made from the same material as the cladding of the laser fiber, thus, it is optically assimilated with the index matching oil when it is dipped therein so as not to interfere with the propagation of the pumping light.

Outside the assembly thus combined is arranged a member made of a transparent fluorocarbon polymer having an inner diameter of 100.30 mm and a thickness of 0.5 mm. The member is surrounded by a metal mold comprised of split molds having an inner gold-plated mirror surface. The introducing port and discharging port are provided above the cylinder, and the index matching oil having a refractive index of 1.458 flows therein at a flow rate of 0.1 litter/min.

Pumping light is generated by laser diodes having an oscillation wavelength of 0.8 $\mu$m and arranged around the cylinders, and is input at a power of 2.5 kW in total. One end of the laser fiber is pressed against a reflection mirror having a reflectance of 99.9%, and the other end of the laser fiber remains a cut surface. As a result, laser oscillation of 1.1 kW and wavelength of 1.06 $\mu$m band is observed.

Next, a second example of the third embodiment is described. In the third embodiment, a Ga—Na—S glass fiber having a 50 $\mu$m core diameter; a 125 $\mu$m cladding diameter; and a numerical aperture of 0.2, in which $Dy^{3+}$ ions of 0.4 at % are doped inside the core, is wound in a single layer around a side surface of the same cylinder as that used in the first example. A core-less single layer Ga—Na—S glass fiber having a diameter of 100 $\mu$m is arranged as a separator outside the laser fiber wound as shown in FIG. 4.

Outside the assembly thus combined is arranged a member made of a transparent fluorocarbon polymer having an inner diameter of 100.30 mm and a thickness of 0.5 mm. The member is surrounded by a metal mold comprised of split molds having an inner gold-plated mirror surface. The introducing port and discharging port are provided above the cylinder, and the index matching fluid having a refractive index of 2.14 is introduced therein at a flow rate of 0.1 litter/min.

Pumping light is generated by a laser diode having an oscillation wavelength of 0.8 $\mu$m and arranged around the cylinders, and is input at a power of 2.5 kW in total. One end of the laser fiber is pressed against a reflection mirror having a reflectance of 99.9% at a wavelength of 3.3 $\mu$m, and the other end of the laser fiber remained a cut surface. As a result, laser oscillation of 150 W and wavelength of 3.3 $\mu$m band is observed.

Figure 5:
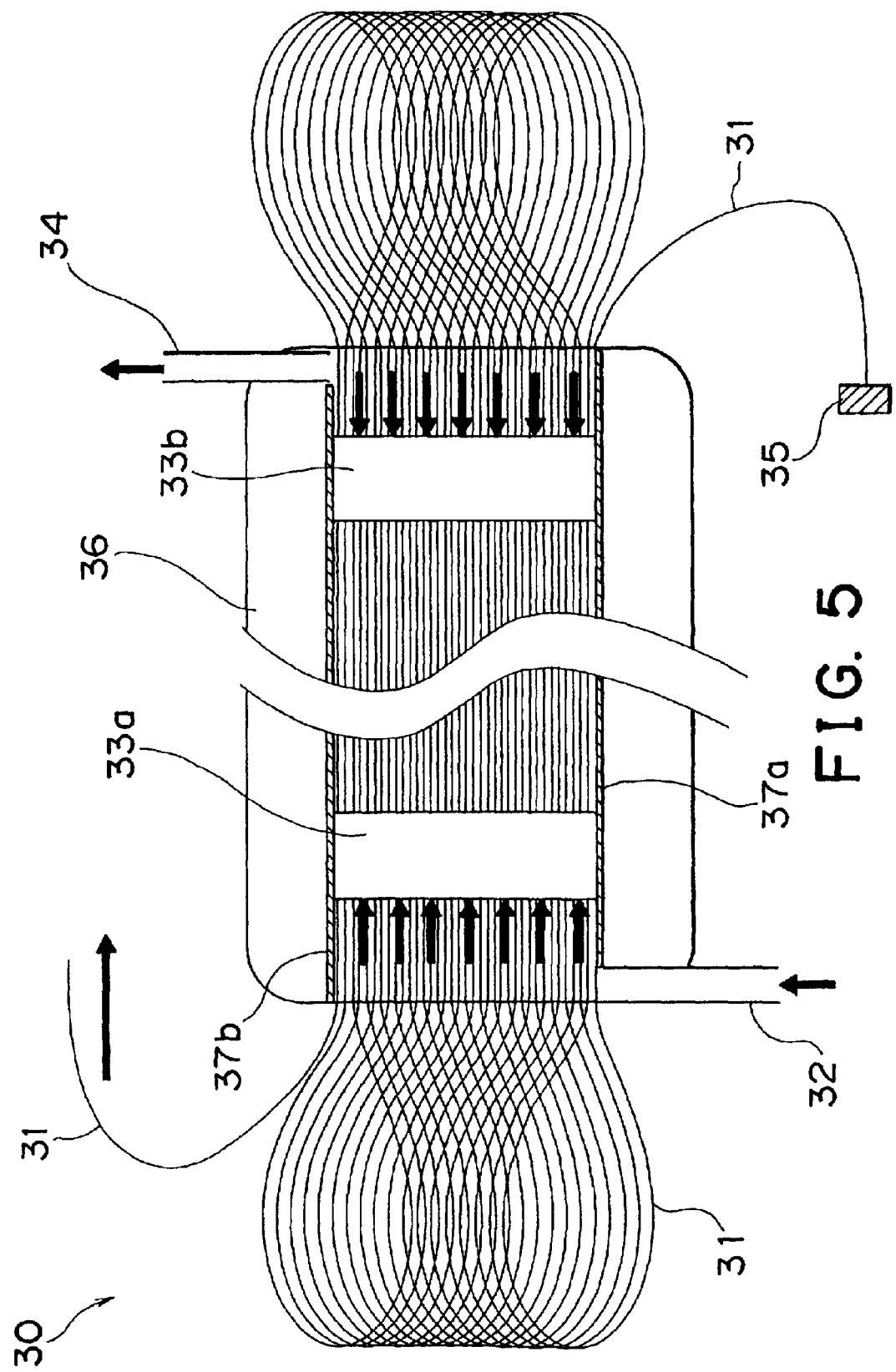
FIG. 5 is a schematic view showing an overall construction of a laser device according to a fourth embodiment.

Next, a fourth embodiment of the invention will be described by referring to FIG. 5. FIG. 5 shows a construction of a laser device 30 of the fourth embodiment.

The laser device 30 of the embodiment comprises: a single laser fiber 31, an introducing port 32 for introducing an index matching oil; lens ducts 33a, 33b for introducing pumping light into the laser fiber 31; a discharging port 34 for discharging the index matching oil; a reflection mirror 35; metallic wires 37a, 37b made of gold or other suitable substance and treated with a transparent polymer such as fluorocarbon polymer; and a metallic base 36 plated with gold or other suitable material and then surface treated with a transparent polymer such as fluorocarbon polymer.

Laser fiber 31 is two-dimensionally arranged within the metallic base 36 by being folded at a plurality of locations, and at both edges of the two-dimensionally arranged laser fiber 31 within the metallic base 36 are arranged the metallic wires 37a, 37b in parallel with the laser fiber 31.

On the laser fiber 31 arranged in the metallic base 36 are arranged two lens ducts 33a, 33b, and the pumping light is introduced to the laser fiber 31 via the lens ducts 33a, 33b. These elements, i.e., laser fiber 31, metallic wires 37a, 37b, lens ducts 33a, 33b are housed in the metallic base 36, which is closed with a closing plate having a surface plated with gold or other suitable material which is further surface treated by a transparent polymer such as fluorocarbon polymer. Here, rows of laser fiber 31 arranged within the metallic base 36 are surrounded by the metallic wires 37a, 37b, metallic base 36 and the closing plate so that the rows of laser fiber 31 are hermetically sealed except for the introducing port 32 and discharging port 34.

Index matching oil is introduced from the introducing port 32, and the introduced index matching oil flows while filling around the laser fiber 31 housed in the metallic base 36 and is discharged through the index matching oil discharging portion 34.

The pumping light is introduced into the lens ducts 33a, 33b and is further introduced into the laser fiber 31 within the metallic base 36. The laser fiber 31 having received the pumping light generates a laser beam and the generated laser beam is transmitted to both ends of the laser fiber 31. The laser beam having reached the end of the laser fiber 31 not provided with the reflection mirror 35 is output therethrough, and the laser beam having reached the end provided with the reflection mirror 35 is reflected therefrom to reach the other end of the laser fiber 31 to be output.

Next, a first example of the fourth embodiment is described. In the fourth embodiment, a single silica based glass fiber having a 50 $\mu$m core diameter; a 125 $\mu$m cladding diameter; and a numerical aperture of 0.2, in which $Nd^{3+}$ ions of 0.4 at % are doped inside the core, is two-dimensionally tightly arranged while being repeatedly folded so as to be aligned in an area of 500 mm×25 mm. The base is a plate comprised of a mirror gold surface further uniformly coated by a 0.01 $\mu$m thick transparent fluorocarbon polymer film, and at both edges of the rows of the laser fiber two-dimensionally juxtaposed on the base are arranged gold wires having a diameter of 200 $\mu$m and coated with a thin transparent fluorocarbon polymer layer in parallel with the laser fiber.

Above the laser fiber arranged on the base, a covering metallic plate comprising a mirror surface with gold plating layer and windows for introducing pumping light into the lens duct is provided, which is further coated with a 0.01 mm thick transparent fluorocarbon polymer film.

Here, pure gold wires provided at both edges of the laser fiber improved the gas tightness of those edges, thereby enabling a high pressure flow of the index matching oil.

Index matching oil having a refractive index of 1.458 flowed from the introducing port at a flow rate of 0.1 litter/min, and pumping light generated by laser diodes having an oscillation wavelength of 0.8 $\mu$m with 2.8 kW power in total is introduced to the laser fiber through the arranged lens ducts. One end of the laser fiber is pressed against a reflection mirror having a reflectance of 99.9%, and the other end of the laser fiber remains a cut surface. Laser oscillation of 1.2 kW power and a wavelength of 1.06 $\mu$m band is observed as a result.

Next, a second example of the fourth embodiment is described. In the fourth embodiment, a single $AlF_3$ fluoride glass fiber, having a 50 $\mu$m core diameter; a 125 $\mu$m cladding diameter; and a numerical aperture of 0.2, in which $Nd^{3+}$ ions of 1.0 at % and $Ce^{3+}$ ions of 0.01 at % are doped inside the core, is tightly arranged while being repeatedly folded in a two-dimensional area of 200×25 mm. The base is a plate comprised of a mirror gold surface further uniformly coated by a 0.01 $\mu$m thick transparent fluorocarbon polymer film, and at both edges of the rows of the laser fiber two-dimensionally juxtaposed on the base are arranged gold wires having a diameter of 200 $\mu$m and coated with a thin transparent fluorocarbon polymer layer in parallel with the laser fiber.

Above the laser fiber arranged on the base, a covering metallic plate comprising a mirror surface with gold plating layer and windows for introducing pumping light into the lens duct is provided, which is further coated with a 0.01 mm thick transparent fluorocarbon polymer film.

A mask is placed across and above the laser fiber thus aligned, which reflects to the laser beam having a wavelength of 1.05 $\mu$m, and then, an excimer laser having a wavelength of 256 nm is irradiated to form a chirped grating in the core of the laser fiber by an induced change of the refractive index thereof. The chirped grating corresponds to a multi-mode dispersion and reduced a transmittance at a wavelength adjacent to 1.05 $\mu$m. As a result, an amplified spontaneous emission at a wavelength of 1.05 $\mu$m is prohibited, which enables a laser oscillation having a wavelength of 1.33 $\mu$m.

Index matching oil having a refractive index of 1.432 is introduced from the introducing port at a flow rate of 0.1 litter/min, and pumping light generated by a laser diode having an oscillation wavelength of 0.8 $\mu$m is introduced 2.8 kW power in total through the arranged lens ducts the laser fiber. One end of the laser fiber is pressed against a reflection mirror having a reflectance of 99.9%, and the other end of the laser fiber remained a cut surface. As a result, laser oscillation of 0.5 kW power and a wavelength of 1.33 $\mu$m band is observed.

Figure 6:
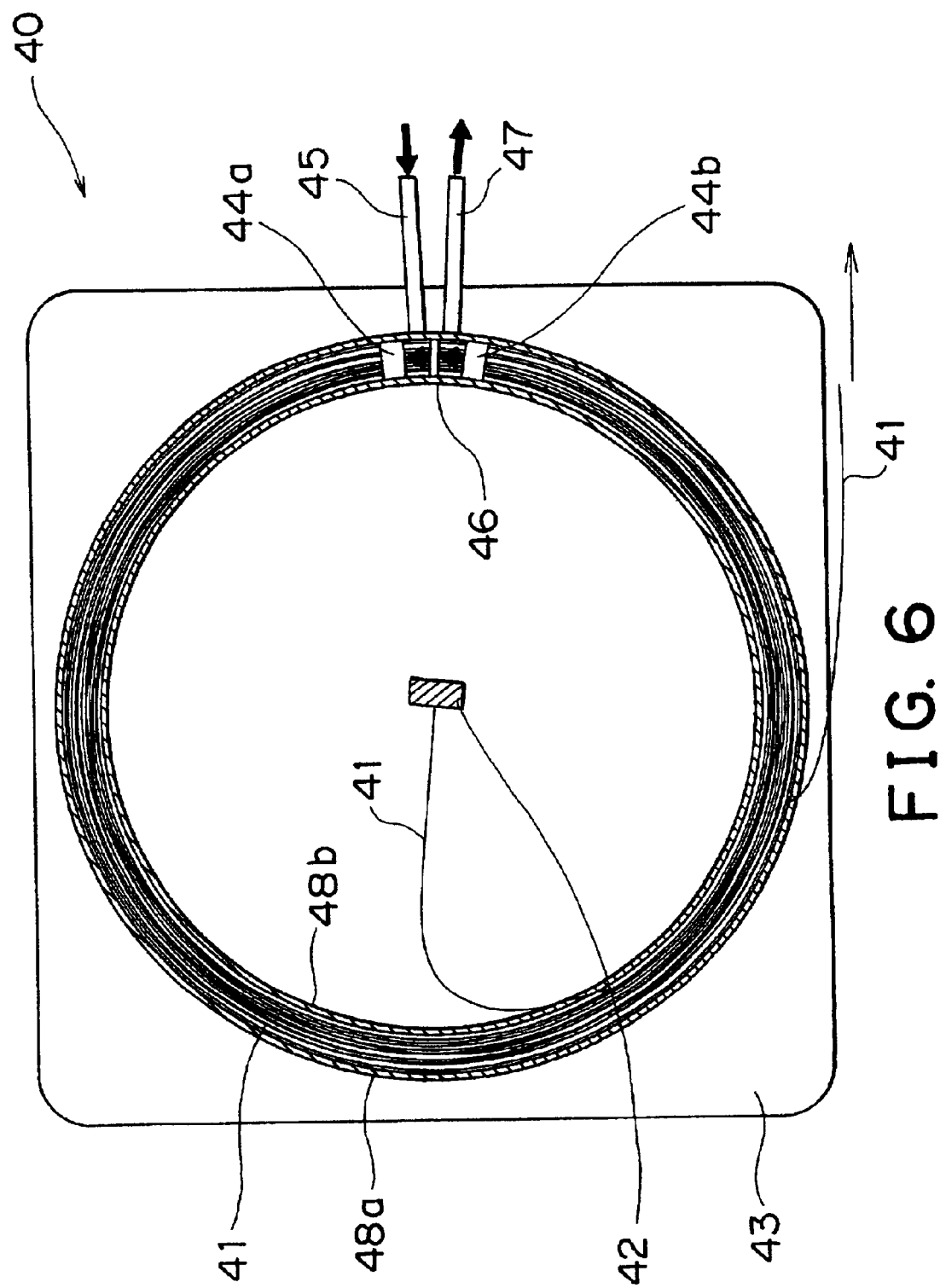
FIG. 6 is a schematic view showing an overall construction of a laser device according to a fifth embodiment.

Hereinafter, a fifth embodiment of the invention will be described by referring to FIG. 6. FIG. 6 shows construction of a laser device 40 of the fifth embodiment.

The laser device 40 of the embodiment comprises: a metallic base 43 having an inner surface plated with gold or other suitable material, which is further surface treated with a transparent polymer such as fluorocarbon polymer; a single laser fiber 41; metallic wires 48a, 48b made of gold or other suitable material; a reflection mirror 42; a separation wall 46; lens ducts 44a, 44b; and an introducing port 45 and a discharging port 47.

The metallic wires 48a, 48b are circularly arranged within the metallic base 43. The circles are concentric and the metallic wire 48a has a larger diameter than the metallic wire 48b.

The laser fiber 41 has one end located inside the circle made by the metallic wire 48b and is tightly wound around the metallic wire 48b, and then it is wound around the wound laser fiber 41, which is repeated to form an annular planar laser fiber 41. The outermost turn of the wound annular planar laser fiber 41 is tightly close to the inner surface of the circle made by the metallic wire 48a, and the outer end surface of the laser fiber 41 is located outside the metallic base 43. The other end of the laser fiber 41 located inside the diameter of the metallic wire 48b is provided with a reflection mirror 42.

An annular planar region made by the circular metallic wires 48a, 48b are separated by a separation wall 46 short-circuiting the two circular wires 48a and 48b, and an introducing port 45 is connected to one region adjacently to the wall 46, and a discharging port 47 is connected to another region adjacent to the wall 46. One lens duct 44a or 44b for each separated region is provided on the laser fiber 41 adjacent to the wall 46. The annular planar region surrounded by two circles of the metallic wires 48a, 48b is closed by a closing plate having an inner surface plated with gold or other suitable material, and which is further surface treated by a transparent polymer such as fluorocarbon polymer.

Index matching oil introduced from the introducing port 45 flows while filling the annular planar region surrounded by the two circular metallic wires 48a, 48b, and is discharged through the discharging port 47.

Pumping light is introduced into the lens ducts 44a, 44b and the lens ducts 44a, 44b further introduce the laser beam into the laser fiber 41. The laser fiber 41 having received the pumping light generates laser beam and the generated laser beam is transmitted to both ends of the laser fiber 41. The laser beam having reached the end not provided with the reflection mirror 42 is output therethrough, and the laser beam having reached the end provided with the reflection mirror 42 is reflected therefrom to reach the other end of the laser fiber 41 to be output.

Next, an example of the fifth embodiment is described. In the fifth embodiment, a single silica based glass fiber having a 50 $\mu$m core diameter; a 125 $\mu$m cladding diameter; and a numerical aperture of 0.2, in which $Nd^{3+}$ ions of 0.4 at % are doped inside the core, is tightly arranged in an annular planar configuration having a diameter of 200 mm$\phi$ in a single layer. The base is a plate having a mirror gold surface further uniformly coated by a 0.01 $\mu$m thick transparent fluorocarbon polymer layer. Gold wires of 200 $\mu$m$\phi$ coated with a thin transparent fluorocarbon polymer layer are arranged inside the innermost turn and outside the outermost turn of the annular planar laser fiber respectively. The end surfaces of the inner gold wire and laser fiber are in a perfect close contact by mutually pressing their respective right angle surfaces thereby to form a mirror having a reflectance of 98%.

Above the laser fiber, lens ducts and a covering plate comprise windows for introducing the pumping light and for introducing and discharging index matching oil. The covering plate is made of a metallic plate having a mirror surface with gold plating, and further coated with a 0.01 mm thick transparent fluorocarbon polymer film. The index matching oil having a refractive index of 1.458 is introduced from the introducing port to flow at a flow rate of 0.1 litter/min, and pumping light of 400 W total power generated by laser diodes having an oscillation wavelength of 0.8 $\mu$m is introduced through the arranged lens ducts to the laser fiber. The output end surface remained a cut surface. A laser oscillation having 70 W power and wavelength of 1.06 $\mu$m band is observed as a result.

Figure 7:
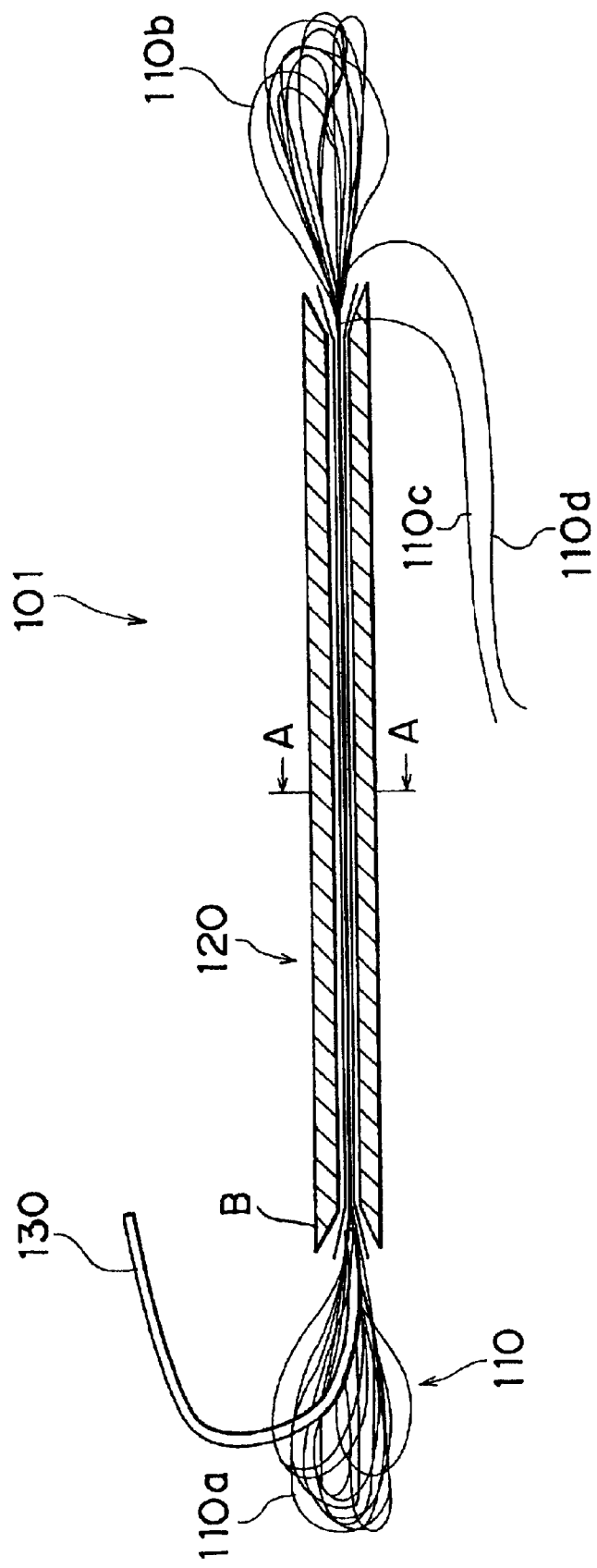
FIG. 7 is a schematic view showing an overall construction of a laser device according to a sixth embodiment.
Figure 8:
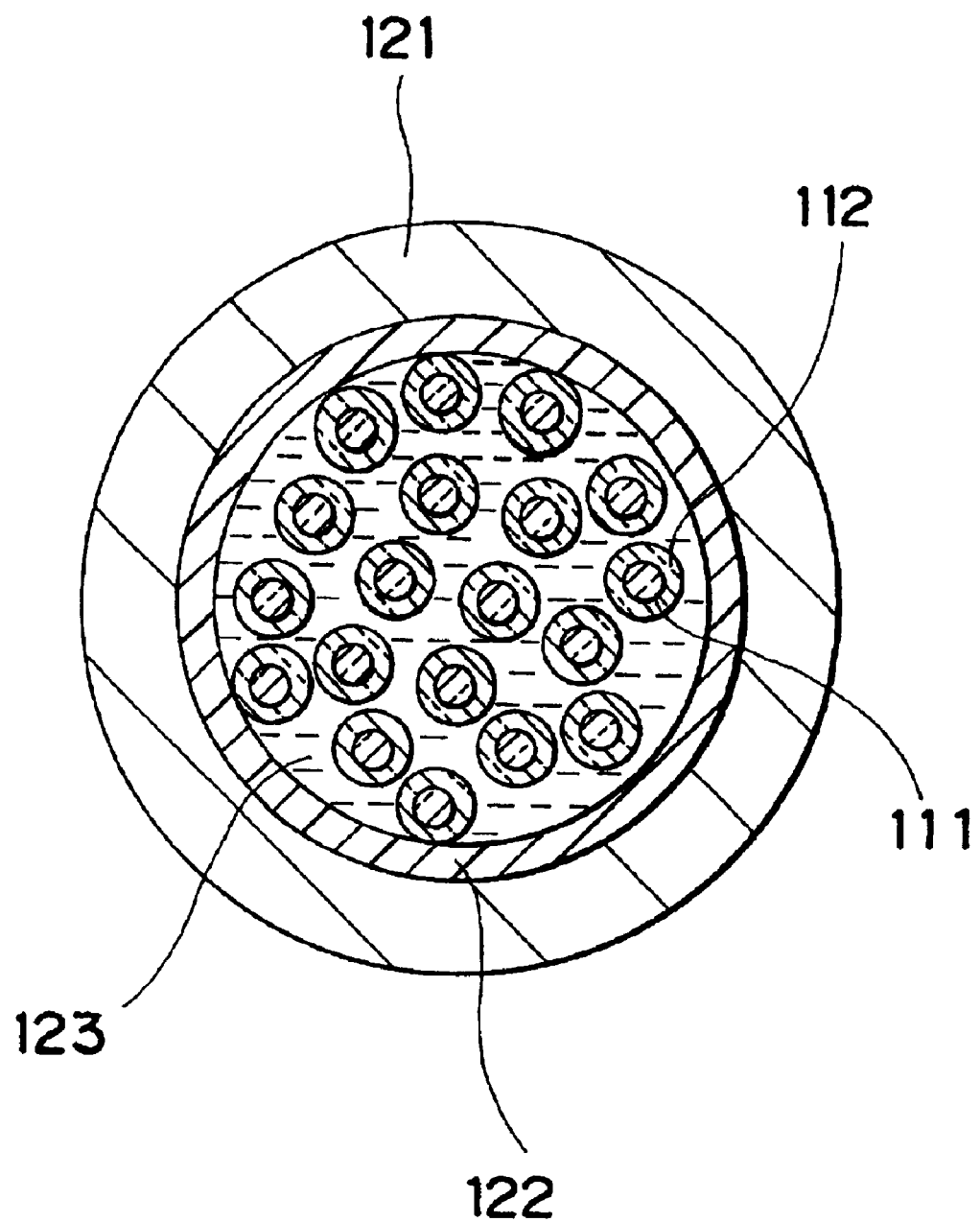
FIG. 8 is a cross sectional view of the bundle portion of FIG. 7 taken along the line A—A.

Next, a sixth embodiment of the present invention is described referring to FIGS. 7 and 8. FIG. 7 shows a construction of a laser device 101 of the sixth embodiment.

The laser device 101 comprises: a single laser fiber 110 including laser medium; a bundle portion 120 for bundling the laser fiber 110; and a pumping light introducing fiber 130 for introducing pumping light into the laser fiber 110.

The laser fiber 110 is folded at a plurality of locations and the central part thereof is housed in and bundled by the bundle portion 120. The folded portions 110a and 100b of the laser fiber 110 are not contained in the bundle portion 120 and are located outside the bundle portion 120. The folded portions 110a and 110b of the laser fiber 110 located outside the bundle portion 120 are covered by a transparent cladding, which is described later. This transparent cladding works as a second cladding.

FIG. 8 shows a cross-sectional view of the bundle portion 120 taken along the line A—A of FIG. 7. The bundle portion 120 comprises: a laser fiber comprised of a cladding 112 and a doped core 111 doped with a laser medium; an index matching oil 123 having substantially the same refractive index, i.e., matching refraction index as the cladding 112; a transparent cladding 122 made of fluorocarbon polymer or the like; and a mirror surface metallic jig 121 plated with gold or other suitable material.

The laser fiber 110 has a coaxial construction comprising the central doped core 111 and a peripheral cladding 112, and the space between the folded laser fiber 110 is filled with the index matching oil 123.

The bundle of the laser fiber 110 and the index matching oil are enclosed in the transparent cladding 122, the exterior of which is further covered by the mirror surface metallic jig 121.

Figure 9:
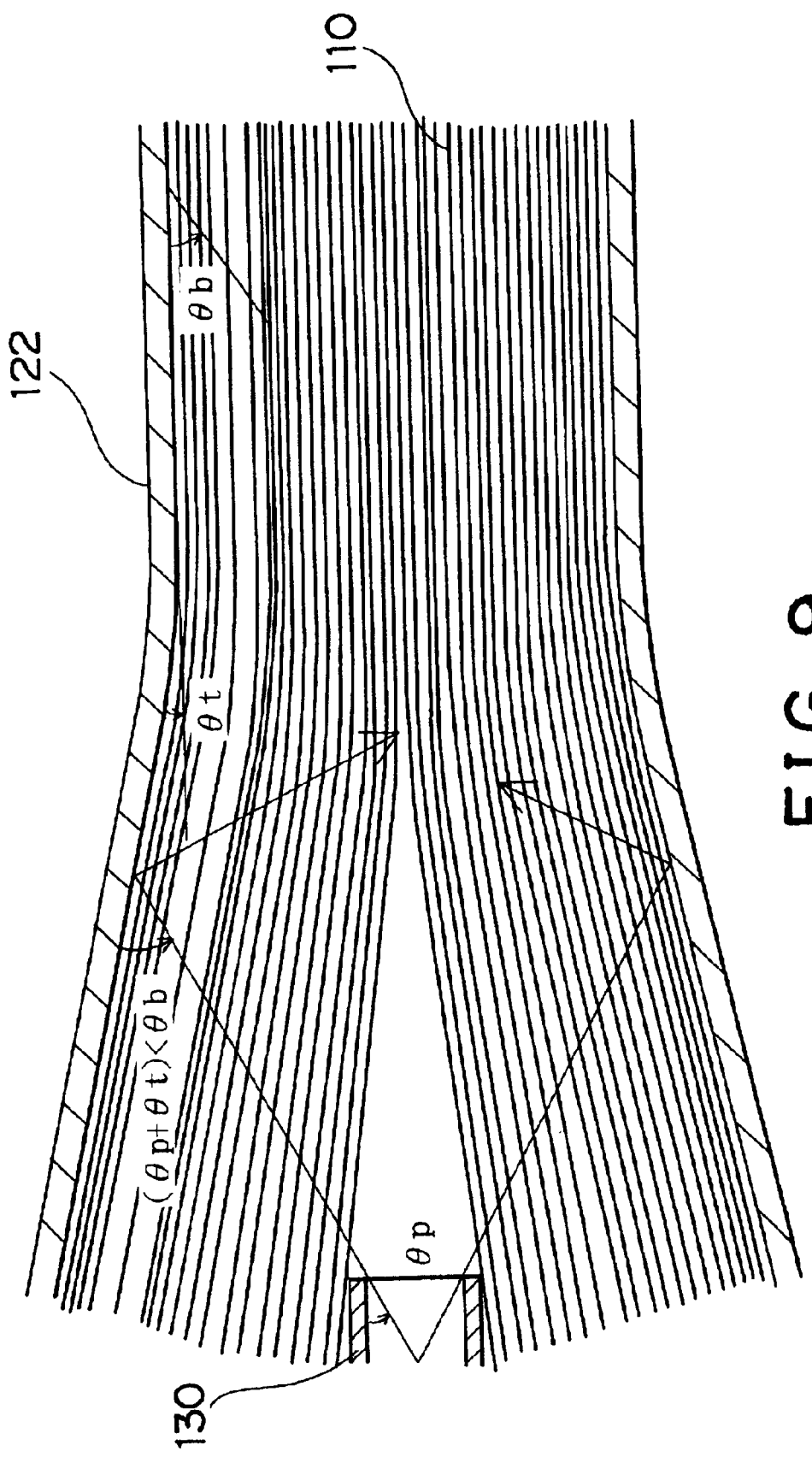
FIG. 9 is a detailed view of section B of FIG. 7.

Next, FIG. 9 shows a detail of section B of FIG. 7. In section B, tips of the pumping light introducing fiber 130 are located, so that, by irradiating the pumping light from the tip of the pumping light introducing fiber 130, the pumping light is introduced into the laser fiber 110. As the pumping light introducing fiber 130, that having a relatively large diameter, or commercially available belt type fiber having a good affinity for use with a high power laser diode, is used.

In FIG. 9, $\theta p$ depicts a critical angle for total reflection for the pumping light introducing fiber 130, and the pumping light irradiated from the pumping light introducing fiber 130 is introduced into the laser fiber 110 as a light having a divergent angle of $2\times(90-\theta p)$.

A critical angle $\theta b$ is depicted for total reflection in the index matching oil 123 and transparent cladding 122, and the pumping light having reached the transparent cladding 122 is totally reflected by the transparent cladding 122 and is confined within the boundary defined by the transparent cladding 122.

In section B, which is an introducing portion for pumping light, the laser fiber 110 and transparent cladding 122 are divergent, and in the case of FIG. 9, the laser fiber 110 and transparent cladding 122 have a divergence having an outward angle of $\theta t$ relative to the central axis of the bundle portion 120.

Here, it is desirable that all the pumping light introduced from the pumping light introducing fiber 130 into the laser fiber 110 should be guided into the bundle portion 120 by total reflection of the transparent cladding 122. In order for establishing this, it is necessary that the angle between the irradiated pumping light from the pumping light introducing fiber 130 and the transparent cladding 122 should not be greater than total reflection critical angle $\theta b$.

The angle between the irradiated pumping light from the pumping light introducing fiber 130 and the transparent cladding 122 becomes maximum when the pumping light irradiated from the pumping light introducing fiber 130 reaches the transparent cladding 122, which has an outer angle divergence of $\theta t$ relative to the central axis of the bundle portion 120, as described above. The angle between the irradiated pumping light from the pumping light introducing fiber 130 and the transparent cladding 122 at that time is expressed as $(\theta p+\theta t)$. Therefore, divergence of the laser fiber 110 and transparent cladding 122 in the section B is set so that divergence angle $\theta t$ will satisfy the formula $(\theta p+\theta t)<\theta b$.

This idea can be applicable to a terminal end of the bundle portion 120 along the direction of pumping light propagation, in which the pumping light unabsorbed in the bundle portion 120 can be recovered with an efficiency of not less than 60%. It is preferable to provide a second cladding to the laser fiber portion 110$b$ exterior of the bundle portion 120.

Next, the function of the fiber laser 101 of this embodiment will be described by referring to FIGS. 7 and 8. The a pumping light introduced from pumping light introducing fiber 130 through section B of the bundle portion 120 propagates across the folded laser fiber 110 within the bundle portion 120, and progresses through the bundle portion 120 while repeating total reflection at the transparent cladding 122. Totally reflected pumping light at the transparent cladding 122 again crosses the bundled laser fiber 110, thus the introduced pumping light will be repeatedly totally reflected while crossing the bundled laser fiber 110.

The pumping light is introduced into the bundle of the doped core 111 of the laser fiber 110 whenever it crosses the bundled laser fiber 110. As the introduced pumping light crosses the bundled laser fiber 110 a plurality of times while being repeatedly totally reflected at the transparent cladding 122, the introduced pumping light will also cross the bundled doped core 111 a plurality of times.

Here, as the cladding 112 and index matching oil 123 have substantially the same refractive index, this construction is optically equivalent with that in which only a plurality of doped cores 111 exist within the transparent cladding 122, thus the pumping light will be absorbed in the doped cores 111 while being reflected by the transparent cladding 122.

The doped core 111 when stimulated by the introduced pumping light generates a laser ray or beam, and the generated laser beam is transmitted to both ends 110$c$ and 110$d$ of the laser fiber 110 to be output.

Thus, in this embodiment, a continuous single laser fiber 110 is folded a plurality of times and the space between the folded fiber is filled with the index matching oil 123, the bundle of laser fiber 110 and index matching oil 123 are enclosed by the transparent cladding 122 and the mirror surface metallic jig 121, into which the pumping light is introduced. Therefore, the introduced pumping light is individually absorbed into the doped core 111 of the bundle of the laser fibers 110 while being repeatedly reflected by the transparent cladding 122 and mirror surface metallic jig 121 so that the absorption rate for the pumping light is greatly increased and oscillation efficiency of the laser fiber 101 can be remarkably improved.

In the above embodiment, a single pumping light introducing fiber 130 is used and the pumping light is introduced only from one end of the bundle portion 120. However, it is possible to provide another pumping light introducing fiber thereby to introduce pumping light from both ends of the bundle portion 120.

Also, in the above embodiment, the gaps between the optical fibers 110 are filled with the index matching oil 123. However, the gaps can be filled with solid material such as thermoplastic resin, thermosetting resin or inorganic glass transparent and having substantially the same refractive index at a wavelength of the pumping light.

Next, a first example of the sixth embodiment is described. In the sixth embodiment, a silica based glass fiber having a 50 $\mu$m core diameter; a 125 $\mu$m cladding diameter; and a numerical aperture of 0.2, in which Nd$^{3+}$ ions of 0.2 at % are doped into the core is used. The fiber having a total length of 18 m is folded 22 times so that a bundle portion length is 600 mm. By folding the fiber in this manner, light travels 1500 mm while being transmitted from a first end fold to the second end fold and then returning to the first end fold.

Fiber portions outside the bundle portion are coated with transparent fluorocarbon polymer having a refractive index of 1.34, and the space between folded fibers within the bundle a portion is filled with the index matching oil having refractive index of 1.458 and transparent in a wavelength range of 0.5~0.85 $\mu$m, and the space is closed by covering with and tightening a heat shrinkable tube having a refractive index of 1.34.

Then, a pumping light introducing fiber having a rectangular cross section of 1.0×0.3 mm and a numerical aperture of about 0.2 is inserted into an end surface of the bundle portion. Here, at the pumping light introducing portion, the divergence angle of the bundle, i.e. the taper angle of the bundle resulting from the enlarged diameter portion of the bundle is adjusted to a maximum of 10 degree. By such adjustment, all the pumping light is guaranteed to be introduced into the bundle portion.

The bundle portion is further fit to a metal mold having an inner diameter of 1 mm comprised of split sectional molds having an overall gold-plated mirror surface to be firmly fixed thereto. The terminal end of the laser fiber is left without being processed to have a Fresnel reflection of about 4%. One end of the pumping light introducing fiber is connected via a cylindrical lens to a semiconductor laser with an oscillation wavelength of about 0.8 μm, and maximum output power of 35 W, thereby to introduce pumping light into the bundle portion. Laser oscillation is observed to be output having 11 W power in a 1.06 μm wavelength band.

Next, a second example of the sixth embodiment is be described. In the sixth embodiment, a glass fiber made of a fluoride grass including aluminum fluoride and zirconium fluoride as main components (hereinafter, referred to as AZF), having a 100 μm core diameter; a 125 μm cladding diameter; and a numerical aperture of 0.2 , in which $Er^{3+}$ ions of 1 wt. % are doped into the core is used. The fiber having a total length of 9 m is folded 22 times so that a bundle portion length is 200 mm. By folding the fiber in this manner, light travels 800 mm while being transmitted from a first end fold to the second end fold and then returning to the first end fold. The background loss of the laser fiber is 50 db/km at a wavelength of 2.8 μm.

Fiber portions outside the bundle portion are coated with transparent fluorocarbon polymer having a refractive index of 1.34, and the space between folded fibers within the bundle portion is filled with a transparent ultraviolet setting resin having a refractive index of 1.443 and transparent in a wavelength range of 0.5~1.4 μm without introducing bubbles, and the space is closed by covering with and tightening a heat shrinkable tube having a refractive index of 1.34.

The bundle portion is fit to a metal mold comprised of split sectional molds having an overall gold-plated mirror surface and further coated with transparent fluorocarbon polymer having a refractive index of 1.34. At this time, a pumping light introducing fiber having a rectangular cross section of 1.0 mm×0.3 mm and a numerical aperture of about 0.2 is inserted into an end surface of the bundle portion. Here, at the pumping light introducing portion, the divergence angle of the bundle, i.e. the taper angle of the bundle resulting from the enlarged diameter portion of the bundle is adjusted to a maximum of 10 degree.

The terminal end of the laser fiber is coated with a reflective coating having a reflectance of 99% at a wavelength of 2.8 μm. Pumping light having a wavelength of 1.53 μm and power of 25 dBm, which is emitted from an erbium doped fiber amplifier (EDFA) is input therefrom. Another end of the laser fiber is coated with anti reflective coating. One end of the pumping light introducing fiber is coupled to a semiconductor laser having an oscillation wavelength of 0.98 μm, and maximum output power of 35 W via a cylindrical lens and another end of the pumping light introducing fiber is inserted in the bundle portion. As a result, laser oscillation is observed to be output having 5 W of power in a 2.8 μm wavelength band.

As a fluoride glass, one including aluminum fluoride, zirconium fluoride or indium fluoride as a main component can be used. However, AZF is most preferred considering anti-laser resistance, durability and a refractive index due to matching with the resin filled in the space.

Hereinafter, a seventh embodiment of the present invention is described referring to FIGS. 10 and 11. This embodiment is a modification of the sixth embodiment. Difference therebetween relates to shapes of mirror surface metallic jig 121 and transparent cladding 122 of the bundle portion 120.

Figure 10:
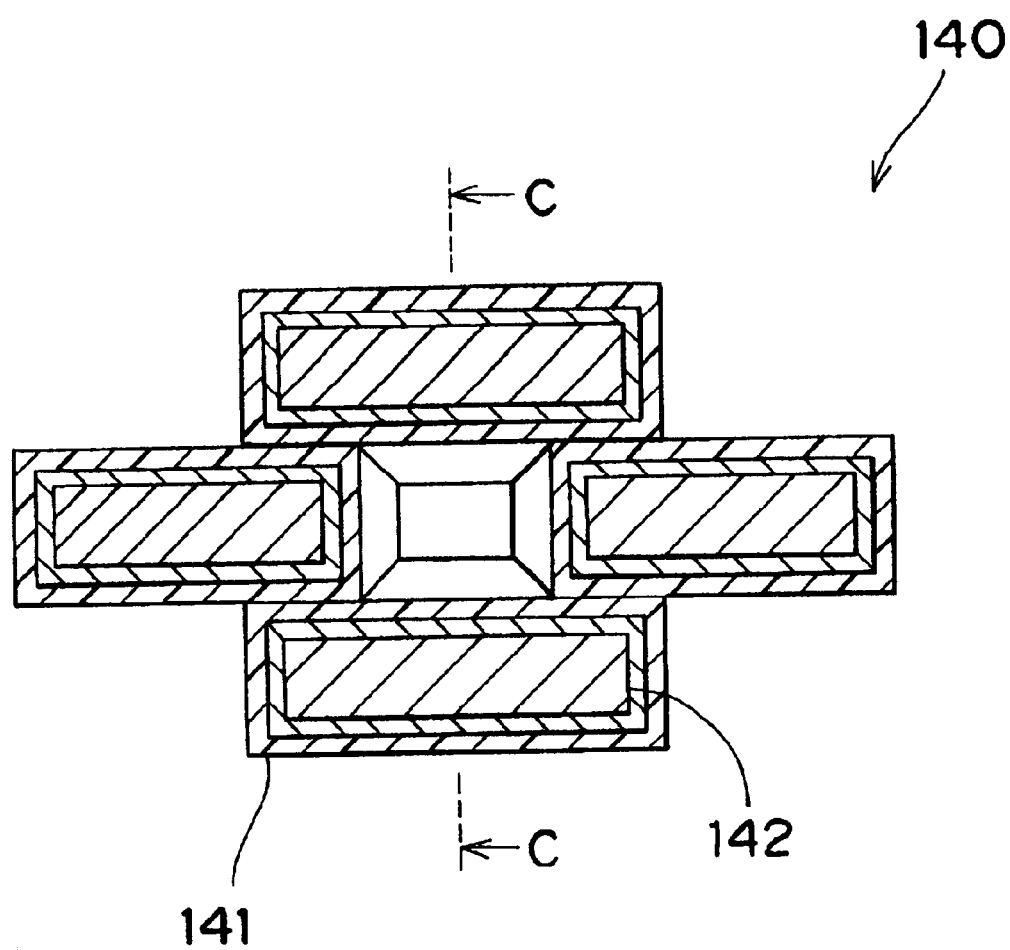
FIG. 10 is a cross sectional view of the bundle portion of according to a seventh embodiment.
Figure 11:
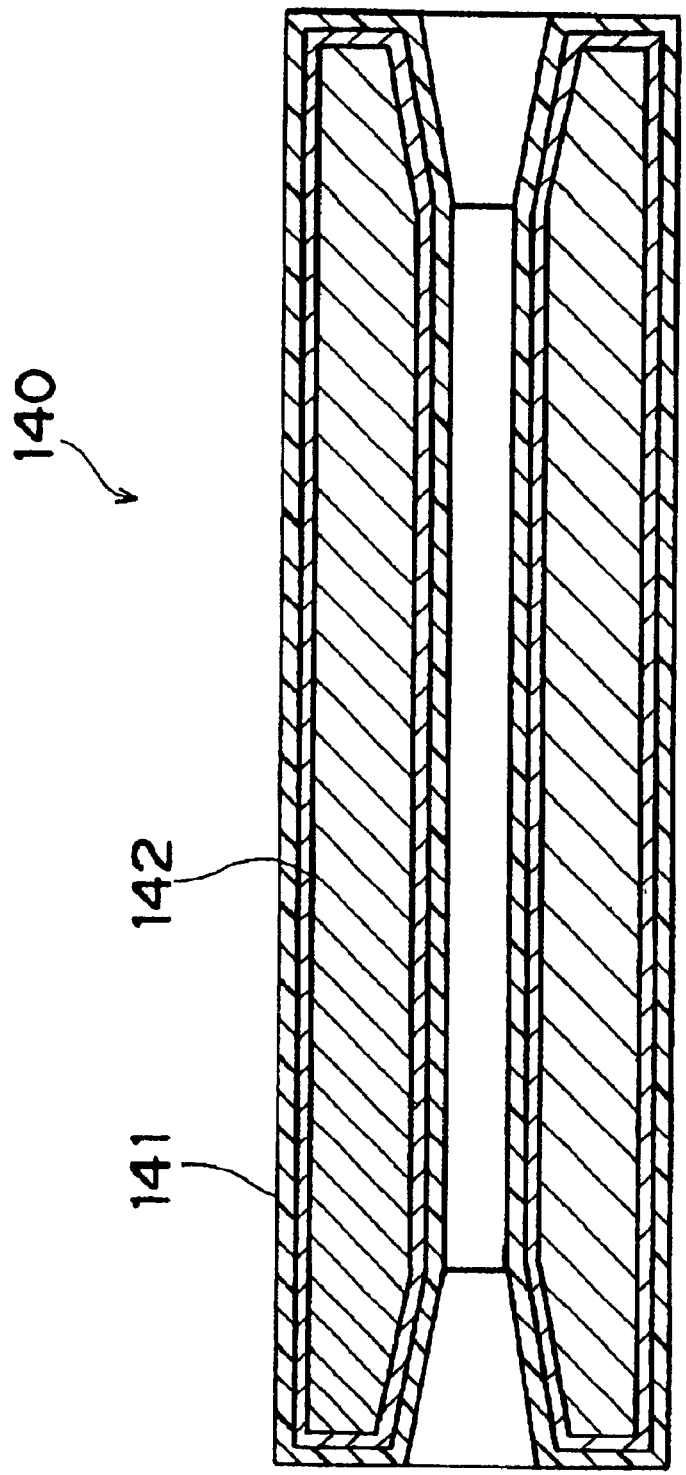
FIG. 11 is a cross sectional view of FIG. 10 taken along the line C—C.

FIG. 10 is a cross sectional view of the bundle portion 140 of the seventh embodiment, and FIG. 11 is a cross sectional view taken along the line C—C of FIG. 10. In these drawings, as the laser fiber 110 and index matching oil 123 have the same feature as the sixth embodiment, the description thereof is omitted.

The bundle portion 140 of this embodiment comprises four blocks, each of which has a plated layer 142 plated with gold or other suitable material and a transparent cladding layer 141 coated on the plated layer, assembled together to surround the laser fiber 110 and index matching oil 123.

Next, an example of seventh embodiment is described. In the seventh embodiment, a silica based glass fiber having a 50 μm core diameter; a 125 μm cladding diameter; and a numerical aperture of 0.2, in which $Nd^{3+}$ ions of 0.2 wt % are doped into the core, is used. The fiber having a total length of 18 m is folded 22 times so that bundle portion length is 600 mm. By folding the fiber in this manner, light travels 1500 mm while being transmitted from a first end fold to the second end fold and then returning to the first end fold.

Fiber portions outside the bundle portion are coated with transparent fluorocarbon polymer having a refractive index of 1.34, and the space between folded fibers within the bundle portion is filled with the index matching oil having a refractive index of 1.4458 and transparent in a wavelength range of 0.5~1.4 μm. Then the bundle portion is enclosed in a gold plated metal jig having a base material of brass and coated with a transparent fluorocarbon polymer, in a rectangular cross section and gas bubbles can be removed from the index matching oil.

Then, a pumping light introducing fiber having a rectangular cross section of 1.0×0.3 mm and a numerical aperture of about 0.2 is inserted into an end surface of the bundle portion. Here, at the pumping light introducing portion, and a divergence angle resulting from the enlarging bundling diameter is adjusted not more than 10 degree. By such adjustment, all the pumping light is introduced into the bundle portion. The terminal end of the laser fiber is left without being processed to have about 4% Fresnel reflection. One end of the pumping light introducing fiber is connected via a cylindrical lens to a semiconductor laser with an oscillation wavelength of about 0.8 μm, and a maximum output power of 35 W, thereby to introduce pumping light into the bundle portion. Laser oscillation is observed to be output from the fiber having 11 W power in a 1.06 μm wavelength band.

Figure 12:
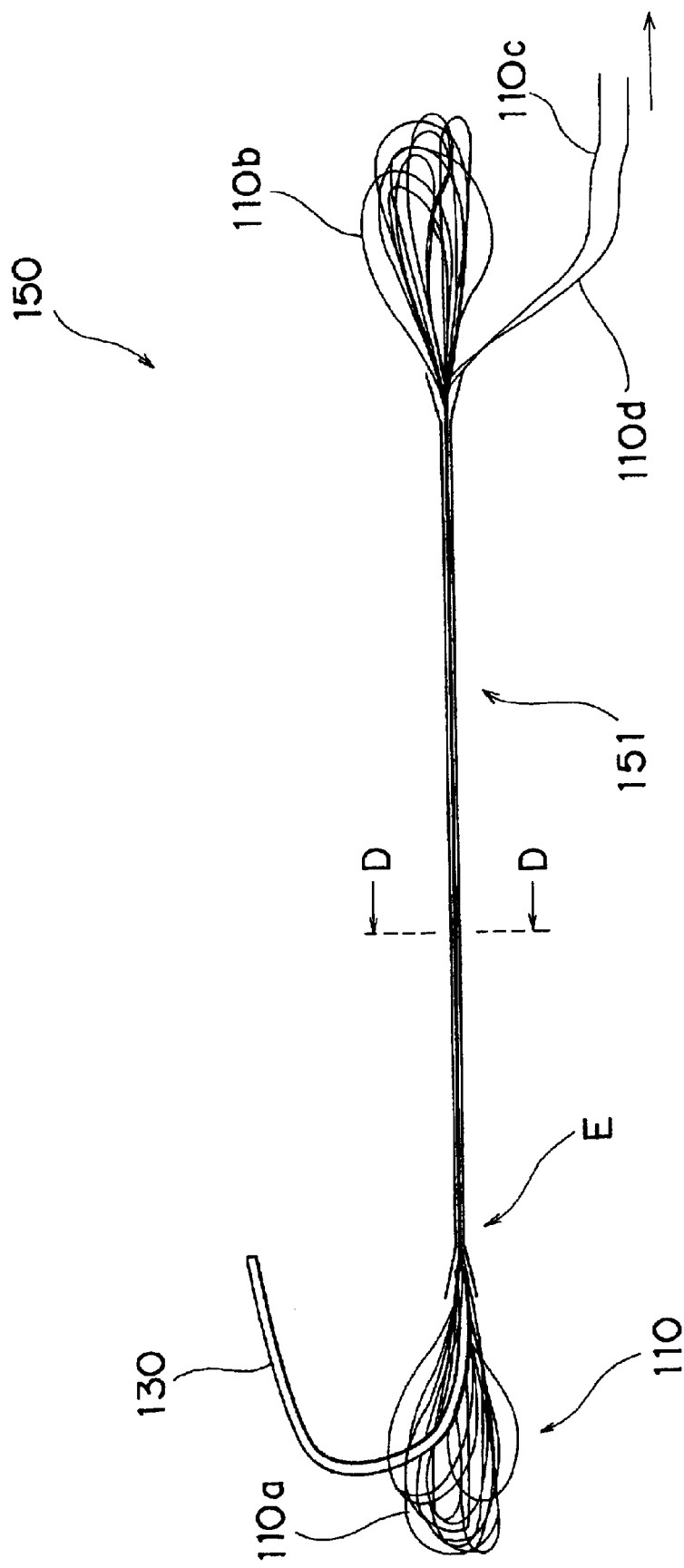
FIG. 12 is a schematic view showing an overall construction of a laser device according to a eighth embodiment.

Hereinafter, an eighth embodiment of the present invention is described referring to FIGS. 12 and 13. FIG. 12 shows a construction of a laser device 150 of the eighth embodiment.

While, in the laser device 101 of the sixth embodiment, the bundle of laser fibers 110 is dipped in the index matching oil 123 in the bundle portion 120, in the laser device 150 of the eighth embodiment, a bundle of laser fibers 110 is integrated by fusing with each other in the bundle portion 151.

Figure 13:
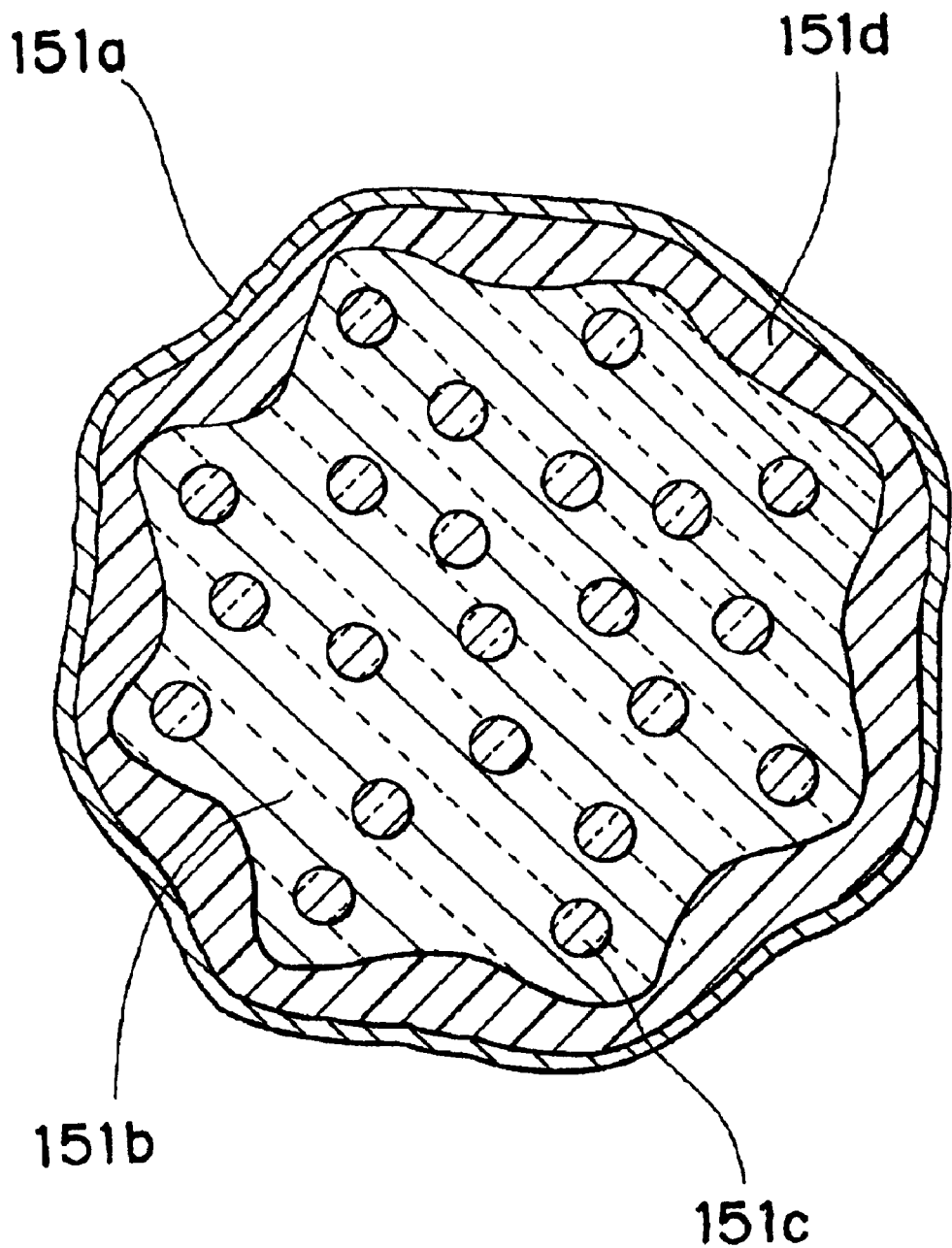
FIG. 13 is a cross sectional view of the bundle portion of FIG. 12 taken along the line D—D.

FIG. 13 is a cross sectional view of the bundle portion 151 taken along the line D—D of FIG. 12. The bundle portion 151 of the laser device 150 according to this embodiment comprises doped cores 151c, a cladding 151b, a transparent cladding layer 151d and a plated layer 151a plated with gold or other suitable material.

The doped core 151c and cladding 151b are formed by folding the laser fiber 151 at a plurality of locations and heating the bundle of folded fibers to fuse the neighboring claddings 151b. The cladding 151b thus formed including the doped cores 151c is covered by the transparent cladding layer 151d, and the surface of the transparent cladding layer 151d is coated with a plated layer 151a. Here, the transparent cladding layer 151d has a smaller refractive index than the cladding 151c as in the other embodiments.

The feature of a pumping light introducing portion E of the bundle portion 151 is similar to that described for the sixth embodiment by referring to FIG. 9. Also, as features of other parts are the same as the sixth embodiment, the description thereof is omitted. By constructing the bundle portion 151 by fusing the a plurality of folded laser fibers 110 as described above, the same effect can be obtained as in the sixth embodiment.

Next, a first example of the eighth embodiment is described. In the eighth embodiment, a silica based glass fiber having a 80 μm core diameter; a 125 μm cladding diameter; and a numerical aperture of 0.2, in which $Nd^{3+}$ ions of 0.4 at % are doped into the core, is used. The fiber having a total length of 60 m is folded 146 times so that the bundle portion length is 200 mm. By folding the fiber in this manner, light travels 800 mm while being transmitted from a first end fold to the second end fold and then returning to the first end fold.

A pumping light introducing fiber having a rectangular cross section of 10.0×0.2 mm, one end of which is finely elongated like a pigtail type fiber in which the pig tail portion is not cladding, with a numerical aperture of about 0.2 is inserted into an end surface of the bundle portion. The entire construction is bundled with a net-like carbon fiber, and an upper bundle portion is firmly connected to the pigtail portion of the pumping light introducing fiber, to which a 100 g weight is added. Then the bundle portion is installed in a drawing furnace for silica fiber and is heated to about 1600° C. so that the fiber bundle portion is gradually drawn to have 1.6 times the original length. Helium gas is introduced into the drawing furnace. As the fiber is partially and gradually fused and drawn, and helium gas is used as the atmospheric gas so as to decrease the amount of bubble formation, a high quality fusion is possible without the introduction of any substantial amount of foreign matter. After the drawing, the average core diameter within the bundle portion became 50 μm. The outer diameter change is moderate enough to create less losses because the taper angle is set within 10 degree so as to completely take up the pumping light.

After cooling, ultraviolet setting resin of a refractive index of 1.445 is applied to the unfused portion of the pumping light introducing portion and is hardened. Then, the overall bundle portion is coated with a transparent fluorocarbon polymer having a refractive index of 1.33, further coated with a gold-mercury amalgam, and heated within a reduced pressure vessel to 200° C. to remove the mercury so as to gold plate the bundle portion. The terminal end of the laser fiber is left without being processed to have about 4% Fresnel reflection. One end of the pumping light introducing fiber is connected via a cylindrical lens to a semiconductor laser having an oscillation wavelength of about 0.8 μm, and maximum output power of 200 W, thereby to introduce pumping light into the bundle portion. Laser oscillation output is observed having an output power of 55 W in a 1.06 μm wavelength band.

Next, a second example of the eighth embodiment is described. This example is substantially similar to the first example, but is different in that the pumping light introducing fibers are connected at both ends of the bundle portion. The pumping light introducing fiber is shaped to have a central finely elongated portion which is formed by a glass blowing process, and fusion of the laser fiber is conducted along the method of the first example.

As in the sixth embodiment, ultraviolet setting resin having a refractive index of 1.445 is applied to the unfused portion of the pumping light introducing portion and is hardened. Then, the overall bundle portion is coated with a fluorocarbon polymer cladding, and the outer surface is coated with gold. The terminal end of the laser fiber is left without being processed to have about 4% Fresnel reflection.

The two terminal ends of the pumping light introducing fiber are respectively connected via a cylindrical lens to a semiconductor laser with oscillation wavelength of about 0.8 μm, and maximum output power of 200 W, thereby to introduce pumping light into the bundle portion (pumping power of 400 W). Laser oscillation output is observed having an output power of 120 W and an output beam diameter of 80 μm in a 1.06 μm wavelength band.

Next, the third example of the eighth embodiment is described. In the eight embodiment, a silica based glass fiber having an 80 μm core diameter; a 125 μm cladding diameter; and a numerical aperture of 0.2, in which $Nd^{3+}$ ions of 0.4 at % are doped into the core is used. The fiber having a total length of 230 m is folded 452 times so that bundle portion length is 250 mm. By folding the fiber in this manner, light will travel 1000 mm while being transmitted from a first end fold to the second end fold and then returning to the first end fold.

Five pumping light introducing fibers having a rectangular cross section of 10.0×0.1 mm and shaped to have a central finely elongated portion are inserted into an end surface of the bundle portion. The entire construction is bundled with carbon fibers, and an upper bundle portion is firmly connected to the pumping light introducing fiber, to which a 500 g weight is added. Then the bundle portion is inserted in a drawing furnace for silica fiber and is heated to about 1600° C. so that the fiber bundle portion is gradually drawn to have 1.6 times its original length. Helium gas is introduced into the drawing furnace as an atmospheric gas. The fiber is partially and gradually fused and drawn, and use of helium gas reduced the amount of bubble formation, so that a high quality fusion is possible with only a little foreign matter introduced.

After cooling, ultraviolet setting resin having a refractive index of 1.445 is applied to the unfused portion of the pumping light introducing portion and is hardened to have a numerical aperture of 0.2. Then, the overall bundle portion is coated with a transparent fluorocarbon polymer having a refractive index of 1.33, further coated with a gold-mercury amalgam, and heated within a reduced pressure vessel to 200° C. to remove the mercury so as to gold plate the bundle portion.

Only one terminal end of the laser fiber is processed with a reflection coating having a reflectance of 99%. Tip ends (ten in total) of the pumping light introducing fiber are connected via a cylindrical lens to a semiconductor laser with an oscillation wavelength of about 0.8 μm, and maximum output power of 200 W, thereby to introduce pumping light into the bundle portion. Laser oscillation output is observed having 1.2 kW power in a 1.06 μm wavelength band.

Next, the fourth example of the eighth embodiment is described. In the eighth embodiment, a silica based glass fiber having a 80 μm core diameter; a 125 μm cladding diameter; and a numerical aperture of 0.2, in which $Nd^{3+}$ ions of 0.4 at % are doped into the core, is used. The fiber having a total length of 230 m is folded 452 times so that bundle portion length is 250 mm. By folding the fiber in this manner, light travels 1000 mm while being transmitted from a first end fold to the second end fold and then returning to the first end fold.

Five pumping light introducing fibers having a rectangular cross section of 10.0×0.1 mm and shaped to have a central finely elongated portion are inserted into an end surface of the bundle portion. The entire construction is bundled with carbon fibers, and an upper bundle portion is firmly connected to the pumping light introducing fiber, to which a 500 g weight is added. Then the bundle portion is inserted in a drawing furnace for silica fiber and is heated to about 1600° C. so that the fiber bundle portion is gradually drawn to have 1.6 times its original length. Helium gas is introduced into the drawing furnace as an atmospheric gas. As the fiber is partially and gradually fused and drawn, the helium gas reduced the amount of bubble formation, and thus, a high quality fusion is possible with only a little foreign matter introduced.

After cooling, an ultraviolet setting resin having a refractive index of 1.445 is applied to the unfused portion of the pumping light introducing portion and is hardened to have a numerical aperture of 0.2. Then, both terminal ends at 10 mm from the edges, where fusion starts, are coated with a transparent fluorocarbon polymer having a refractive index of 1.34 along a circumferential dotted line thereabout to have a 0.3 m thickness within a class 10 clean room. The fused portion is sandwiched by a split mold metallic jig comprising a couple of split molds having an inner diameter of 2.7 mmφ and a mirror finished gold plated surface.

Here, a tensile force of about 50 g is loaded to the fused portion. These processes are also conducted in a class 10 clean room to avoid any adhesion of dust, dirt, or contamination to the surface of fused portion. This assembly together with the metallic jig is encased in a casing in which a coolant Helium gas can be circulated. Helium gas is passed through a gas inline filter capable of removing 99.9% of particles not greater than 0.3 μm. By such construction, the numerical aperture of the fused portion of the laser fiber is less than 1, and the critical reflection angle within the bundle portion is 47 degree which is almost maximum, so that pumping light confining performance is greatly improved. Only one terminal end of the laser fiber is processed with a reflection coating having a reflectance of 99%.

Tip ends (ten in total) of the pumping light introducing fiber are connected via a cylindrical lens to a semiconductor laser with an oscillation wavelength of about 0.8 μm, and a maximum output power of 200 W, thereby to introduce pumping light into the bundle portion. Laser oscillation output is observed having 1.3 kW of power in a 1.06 μm wavelength band. Laser characteristics are not affected significantly when the space between the glass fiber fused body and metallic jig of the laser body according to this embodiment is degassed by a vacuum pump.

Next, the fifth example of the eighth embodiment is described. In the eighth embodiment, a Ga—Na—S glass fiber having a 80 μm core diameter; a 125 μm cladding diameter; and a numerical aperture of 0.35, in which $Pr^{3+}$ ions of 0.4 at % are doped into the core, is used. The fiber having a total length of 40 m is folded 90 times so that the bundle portion length is 200 mm. By folding the fiber in this manner, light travels 800 mm while being transmitted from a first end fold to the second end fold and then returning to the first end fold.

A pumping light introducing fiber made of the same Ga—Na—S glass as used in the cladding, and having a rectangular cross section of 10.0×0.2 mm, central part of which is finely elongated, with a numerical aperture of approximately 0.2 is inserted into an end surface of the bundle portion. The entire construction is surrounded by a lead-silica glass tube having a rectangular cross section, a thickness of 1 mm and an inner diameter 3×5 mm. The upper part of the entire construction is firmly connected to the pigtail portion of the pumping light introducing fiber. Then, the entire construction is installed in a drawing furnace for chalcogenide fiber and is heated to about 550° C. so that the fiber bundle portion is gradually drawn to have 1.6 times the original length together with the lead silica based glass tube. Helium gas including 5% of hydrogen sulfide is introduced into the drawing furnace. As the fiber is partially and gradually fused and drawn, and helium gas is used as the atmospheric gas so as to decrease the amount of bubble formation, a high quality fusion is possible without the introduction of any substantial amount of foreign matter. Due to the hydrogen sulfide contained in the helium gas, crystallization of the chalcogenide glass fiber is prohibited.

After the drawing, the average core diameter within the bundle portion becomes 50 μm. The outer diameter change is moderate enough to create less losses because the taper angle is set within 10 degree so as to completely take up the pumping light.

After cooling, ultraviolet setting resin having a refractive index of 1.445 is applied to the unfused portion of the pumping light introducing portion and is hardened. Then, the overall bundle portion is coated with a gold-mercury amalgam, and heated within a reduced pressure vessel to 200° C. to remove the mercury so as to gold plate the bundle portion. As the lead-silica glass has a refractive index of 1.73 and chalcogenide glass has a refractive index 2.14, the lead-silica glass worked as cladding covering the bundle portion in this case.

The terminal end of the laser fiber is left without being processed to have about 4% Fresnel reflection. One end of pumping light introducing fiber is connected via an optical fiber to 16 Er-doped fiber amplifiers having an oscillation wavelength of about 1480 nm, and maximum output power of 0.25 W.

Pumping light is introduced into the bundle portion from eight pumping light introducing fibers in each side of the bundle portion from sixteen Er-doped fiber amplifiers. As a result, a laser oscillation output is observed having an output power of 1 W in a 5 μm wavelength band.

Figure 14:
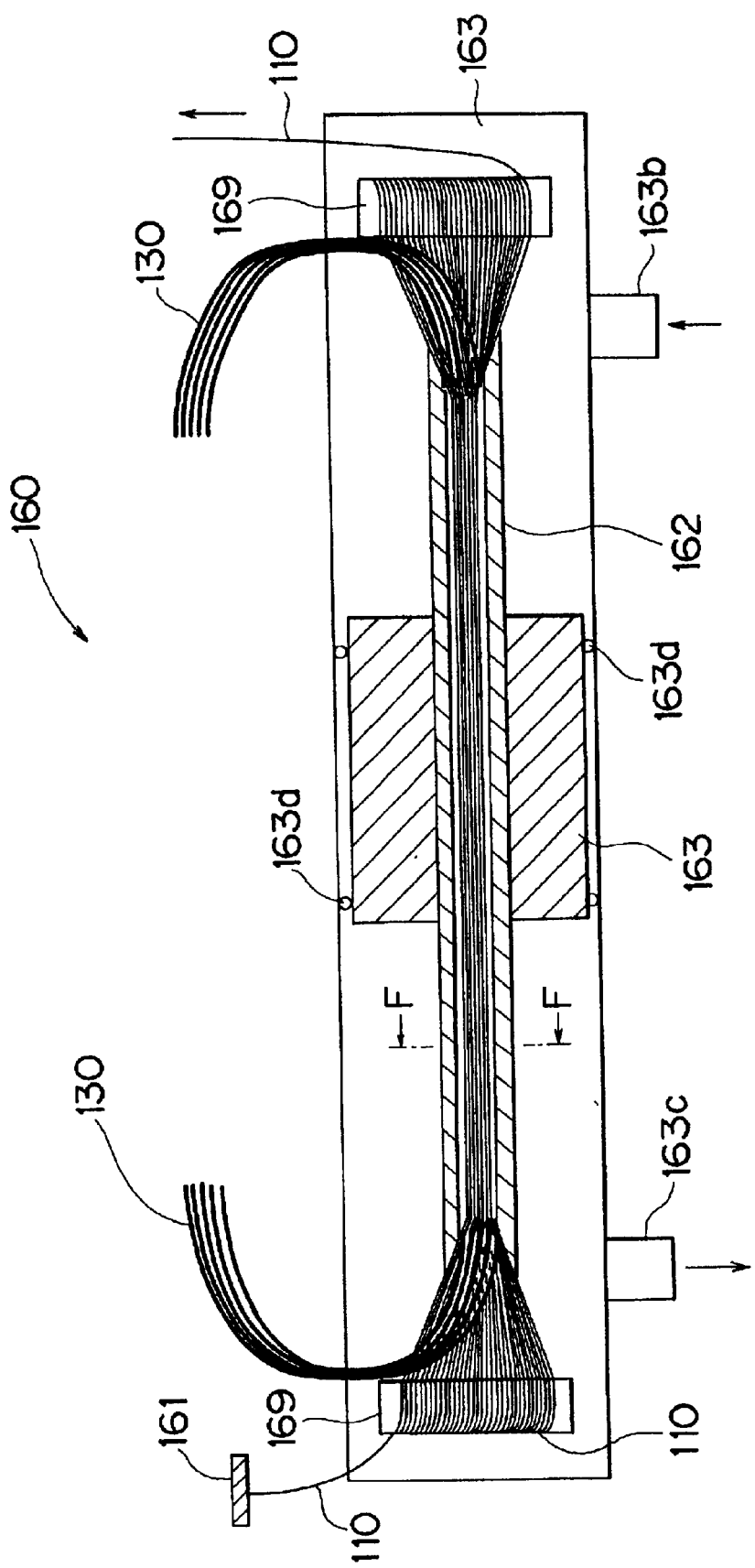
FIG. 14 is a schematic view showing an overall construction of a fiber laser according to a ninth embodiment.

Hereinafter, a ninth embodiment of the present invention is described referring to FIGS. 14 and 15. FIG. 14 shows construction of a laser device 160 of the ninth embodiment.

The laser device 160 of the embodiment comprises: a single laser fibers 110; winding drums 169 for winding the laser fiber 110; pumping light introducing fibers 130; an introducing port 163b; a discharging port 163c; a reflection mirror 161; a bundle portion 162; O-rings 163d; a separation wall 163a; and a metallic jig 163 having inner surface plated with metal such as gold which is further surface treated with a transparent polymer such as fluorocarbon polymer.

Laser fiber 110 is bundled after being folded at a plurality of locations by the bundle portion 162. The folded portion of the laser fiber 110 is wound to the winding drum 169, located at the both end of the bundle portion 162, and is fixed thereto. A reflection mirror 161 is attached to one end of the laser fiber 110 and the other end of the laser fiber 110 remains a cut surface.

At both longitudinal edges of the laser fiber 110, tips of a plurality of pumping light introducing fibers 130 are provided for introducing pumping light into the bundle portion 162.

At the longitudinal central portion of the laser fiber 110, separation walls 163a are provided to sandwich the bundle portion 162 therein, and O-rings 163d are attached outside the separation wall 163d.

The laser fiber 110; winding drums 169; pumping light introducing fibers 130; introducing port 163b; bundle portion 162; separation wall 163a; and O-rings 163d are housed in a vessel shaped metallic jig 163, which is covered with a plated surface plated with gold or other suitable material and a transparent polymer such as fluorocarbon polymer coated on the plated surface.

Here, both ends of the laser fiber 110 and unbundled end of the pumping light introducing fiber 130 are located outside the metallic jig 163. The separation wall 163a separates the inner space within the metallic jig 163 into two regions, and the O-rings 163d are provided for enhancing the gas tightness between these regions. The introducing port 163b is connected to one of the two regions separated by the separation wall 163a, and discharging port 163c to the other one of the two regions.

Figure 15:
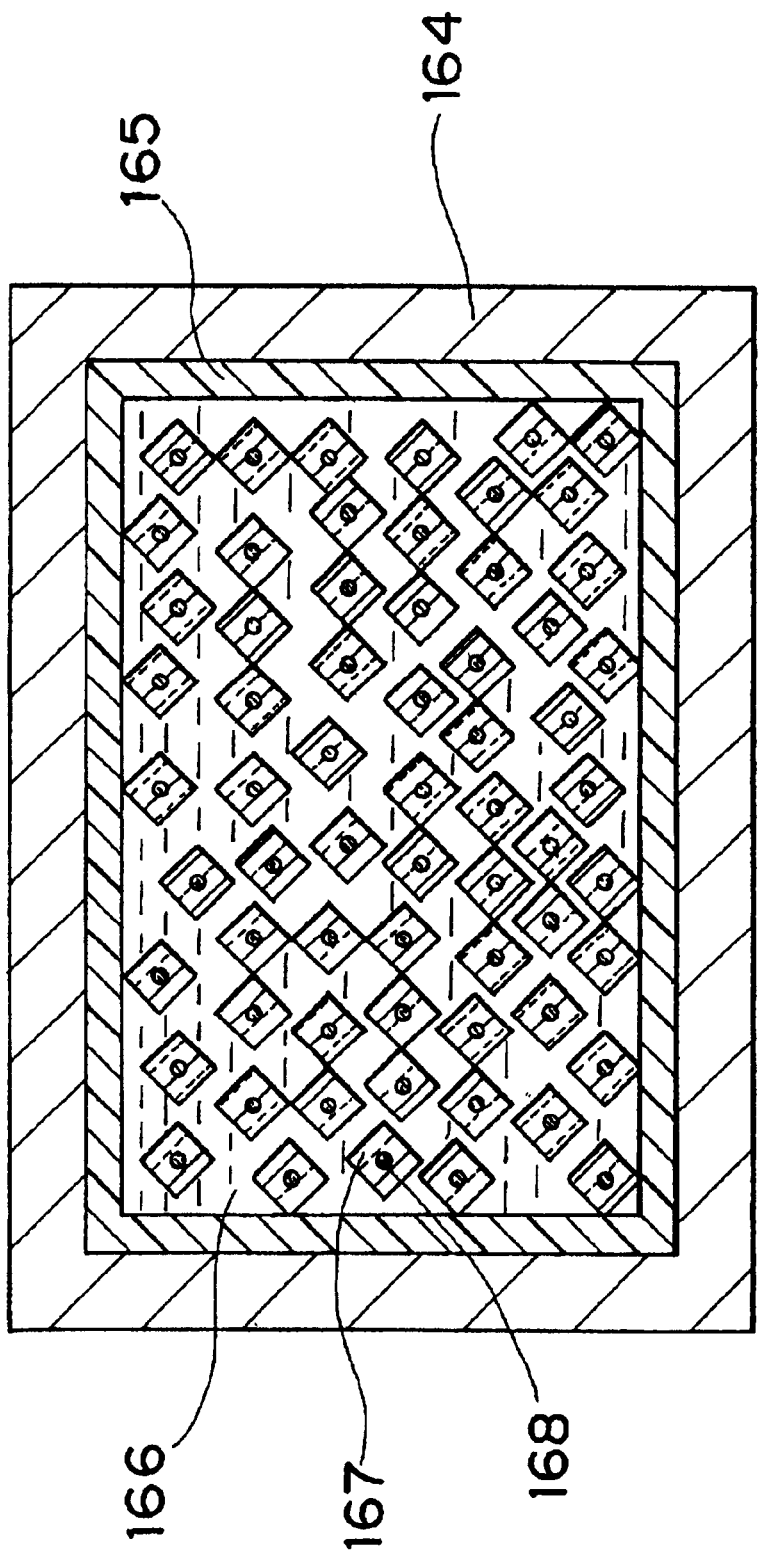
FIG. 15 is a cross sectional view of the bundle portion taken along the line F—F FIG. 14.

FIG. 15 shows a cross-sectional view of the bundle portion 57 along line A—A of FIG. 14. In the bundle portion 162, the folded laser fiber 110 is bundled and the space between the bundled laser fiber is filled with index matching oil 166. The laser fiber 110 has a coaxial construction comprising a central doped core 168 and a peripheral cladding 167.

The outer wall portion of the bundle portion is comprised by a metallic jig 164 having an inner surface coated with gold or other suitable material, and a transparent polymer cladding 165 made of fluorocarbon polymer or the like covering the metallic jig 164, so that introduced pumping light is reflected inside the bundle portion 162.

Here, the materials for the cladding 167 and index matching oil 166 are selected to have substantially the same refractive index to each other, and the material for the doped core 168 is selected to have a higher refractive index than the cladding 167 and index matching oil 166. Also, the transparent polymer cladding 165 has a lower refractive index than the cladding 167, index matching oil 166 and doped core 168.

Next, operation of the laser device 160 is described by referring to FIGS. 14 and 15. The index matching oil 166 introduced from the introducing port 163b fills one of the regions separated by the separation wall 163d, and flows through the interior of the bundle portion 162 to reach the other region separated by the separation wall 163d. Thereafter, the index matching oil 166 fills the other region and then is discharged from discharging port 163c.

The pumping light introduced by the pumping light introducing fiber 130 is repeatedly reflected within the bundle portion 162 to reach the doped core 168 of the laser fiber 110 and the laser fiber 110 irradiated by the pumping light generates a laser beam. The generated laser beam is transmitted to both ends of the laser fiber 110. The laser beam having reached an end without the reflection mirror 161 will be output therethrough, and the laser beam having reached the end of the laser fiber 110 with the reflection mirror 161 is reflected there to be output from the other end of the laser fiber 110.

Next, a first example of the ninth embodiment of the present invention will be described. In the ninth embodiment, a silica based glass fiber having a 80 μm core diameter; a 125 μm cladding diameter; and a numerical aperture of 0.2, in which $Nd^{3+}$ ions of 0.4 at % are doped into the core, is used. The fiber having a total length of 230 m is folded 452 times so that the bundle portion length is 250 mm. By folding the fiber in this manner, light travels 1000 mm while being transmitted from a first end fold to the second end fold and then returning to the first end fold.

Five pumping light introducing fibers having a rectangular cross section of 10.0×0.1 mm are respectively inserted into both end surfaces of the bundle portion, thus providing 10 pumping light introducing fibers in total. This assembly is encased in a metallic jig having a base material of brass and a pure gold plated surface (mirror surface) which is further coated with transparent fluorocarbon polymer having a refractive index of 1.34, and a rectangular cross section provided with a central separation wall, as shown in FIG. 14.

The portions located outside the pumping light introducing portion are covered by a transparent fluorocarbon polymer having a refractive index of 1.34 for the laser fiber, and an ultraviolet setting resin having a refractive index of 1.445 for the pumping light introducing fiber. The laser body constructed as described above is installed in an outer metallic casing, and an oil circulation pump is connected to introduce transparent index matching oil having a refractive index of 1.458 into the casing and to pressurize it to circulate the index matching oil to pass through the laser bundle portion. Pressure is set at 3 kg/cm$^2$. Both ends of the laser fiber are drawn out from the casing, and the port where the fiber is drawn out is hermetically sealed with resin so that pressure did not leak from inside the casing. One end of the laser fiber is pressed against a reflection mirror having a reflectance of 99.9%, and the other end remained a cut broken surface.

The pumping light introducing fiber is connected via a cylindrical lens to a semiconductor laser with an oscillation wavelength of about 0.8 μm, and maximum output power of 200 W, thereby to introduce pumping light into the bundle portion. Laser oscillation is observed to be output from the broken cut end surface of the laser fiber having 1.2 kW of power in a 1.06 μm wavelength band. Here, no damage to the index matching oil due to pumping laser light is observed.

Next, a second example of the ninth embodiment of the present invention is described. In the ninth embodiment, a silica based glass fiber having a 80 μm core diameter; a 125 μm cladding diameter; and a numerical aperture of 0.2, in which $Nd^{3+}$ ions of 0.5 at % are doped into the core, is used. The fiber having a total length of 90 m is folded 174 times so that the bundle portion length is 250 mm. By folding the fiber in this manner, light travels 1000 mm while being transmitted from a first end fold to the second end fold and then returning to the first end fold.

Five pumping light introducing fibers having a rectangular cross section of 10.0×0.4 mm are respectively inserted into both end surfaces of the bundle portion, thus providing 10 pumping light introducing fibers in total. This assembly is encased in a metallic jig having a base material of brass and a pure gold plated surface (mirror surface) which is further coated with transparent fluorocarbon polymer having a refractive index of 1.34, and a rectangular cross section provided with a central separation wall, as shown in FIG. 14.

The portions located outside the pumping light introducing portion are covered by a transparent fluorocarbon polymer having a refractive index of 1.34 for the laser fiber, and an ultraviolet setting resin having a refractive index of 1.445 for the pumping light introducing fiber.

Laser body constructed as described above is installed in an outer metallic casing, and an oil circulation pump is connected to introduce transparent index matching oil having a refractive index of 1.458 into the casing and to pressurize it to circulate the index matching oil to pass through the laser bundle portion. Pressure is set at 3 kg/cm². Both ends of the laser fiber are drawn out from the casing, and the port where the fiber is drawn out is hermetically sealed with resin so that pressure did not leak from inside the casing. One end of the laser fiber is pressed against a reflection mirror having a reflectance of 99.9%, and the other end remained a cut broken surface.

Ten pumping light introducing fibers of each side of the bundle portion are connected via a cylindrical lens to a semiconductor laser with an oscillation wavelength of about 0.98 μm, and maximum output power of 100 W, thereby to introduce the pumping light into the bundle portion. Laser oscillation is observed to be output from the broken cut end surface of the laser fiber having 0.8 kW of power in a 1.03 μm wavelength band. Here, no damage to the index matching oil due to pumping laser light is observed.

Next, a third example of the ninth embodiment of the present invention will be described. In the ninth embodiment, a multicomponent alumino silicate glass fiber having a 10 μm core diameter; a 125 μm cladding diameter; and a numerical aperture of 0.11, in which $Er^{3+}$ ions of 5000 ppmwt and $Yb^{3+}$ ions of 5 wt % are doped into the core, is used. The fiber having a total length of 230 m is folded 452 times so that the bundle portion length is 250 mm. By folding the fiber in this manner, light travels 1000 mm while being transmitted from a first end fold to the second end fold and then returning to the first end fold.

Five pumping light introducing fibers having a rectangular cross section of 10.0×0.1 mm are respectively inserted into both end surfaces of the bundle portion, thus providing 10 pumping light introducing fibers in total. This assembly is encased in a metallic jig having a base material of brass and a pure gold plated surface (mirror surface) which is further coated with transparent fluorocarbon polymer having a refractive index of 1.34, and a rectangular cross section provided with a central separation wall, as shown in FIG. 14.

The portions located outside the pumping light introducing portion are covered by a transparent fluorocarbon polymer having a refractive index of 1.34 for the laser fiber, and an ultraviolet setting resin having a refractive index of 1.445 for the pumping light introducing fiber.

The laser body constructed as described above is installed in an outer metallic casing. The metallic casing is divided into two regions by the laser body. In one of the regions is provided an index matching oil introducing portion, and in the other of it the regions is provided an index matching oil discharging portion. The index matching oil introducing portion is connected to an oil circulation pump to introduce transparent index matching oil having a refractive index of 1.523 into the casing and to pressurize it to circulate the index matching oil to pass through the laser bundle portion. Pressure is set at 3 kg/cm². Both ends of the laser fiber are drawn out from the casing, and the port where the fiber is drawn out is hermetically sealed with resin so that pressure did not leak from inside the casing. One end of the laser fiber is set to input 40 signal waves having the wavelengths of 1.53–1.57 μm at the same time. The other end of the laser fiber is connected to a silica based glass fiber by coupling diagonally cut faces for outputting the amplified signals.

Figure 16:
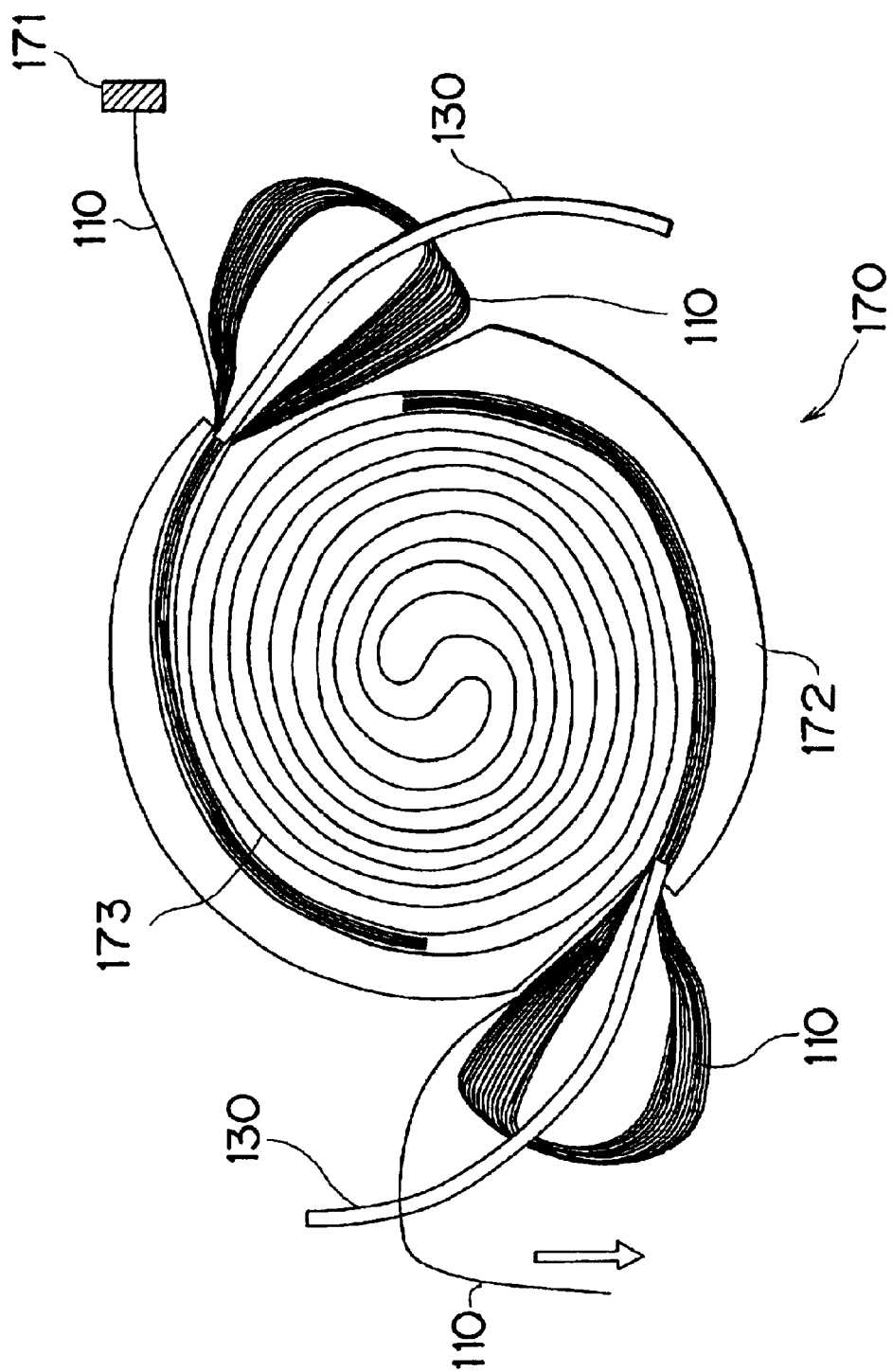
FIG. 16 is a schematic view showing an overall construction of a laser device according to a tenth embodiment.

The pumping light introducing fiber is connected via a cylindrical lens to a semiconductor laser with an oscillation wavelength of about 0.98 μm, and maximum output power of 50 W. An intensity of the input signal is 6 dBm in total, and the amplified signal output reached up to 55 dBm in total. Here, no damage to the index matching oil due to pumping laser light is observed. Also, by adjusting the intensity of the pumping light, amplification deviation is decreased to less than ±1 dB Hereinafter, a tenth embodiment of the invention is described referring to FIG. 16. FIG. 16 shows a construction of a laser device 170 of the tenth embodiment.

The laser device 170 of the embodiment is a modification of the laser device 160 of the ninth embodiment shown in FIGS. 14 and 15, and comprises: a metallic base 172 which is plated with gold or other suitable material and is further coated with a transparent polymer such as fluorocarbon polymer; the laser fiber 110; pumping light introducing fibers 130; a reflection mirror 171; and a fiber bundle guide groove 173.

The fiber bundle guide groove 173 is formed as a single groove spirally located inside the metallic base 172, both ends of which are respectively connected to the exterior of the metallic base 172. The laser fiber 110 is folded at a plurality of locations to be bundled, and the bundle of folded fibers is arranged along the fiber bundle guide groove 173. The laser fiber 110 thus arranged along the fiber bundle guide groove 173 has its folded portions and both of the terminal ends drawn to the exterior of the metallic base 172 through the two terminal ends of the fiber bundle guide groove 173, and the drawn out portion from the metallic base 172 is provided with a second cladding.

The reflection mirror 171 is attached to one end surface of the laser fiber 110 which is drawn outside. The index matching oil is introduced into the fiber bundle guide groove 173 thereby to fill the space around the laser fiber 110. The pumping light introducing fibers 130 are connected to two exit portions of the fiber bundle guide groove 173, thereby to introduce pumping light into the laser fiber 110.

A laser beam generated by the introduced pumping light is transmitted to both ends of the laser fiber 110. The laser beam having reached the reflection mirror 171 is reflected therefrom to finally reach the end without the reflection mirror 171 and is output therefrom.

Next, an example of tenth embodiment is described. In the tenth embodiment, a silica based glass fiber having a 7 μm core diameter; a 60 μm cladding diameter; and a numerical aperture of 0.11, in which $Nd^{3+}$ ions of 0.4 at % are doped into the core, is used. The fiber having a total length of 570 m is folded 452 times so that the bundle portion length is 2.0 m. By folding the fiber in this manner, light travels 2.5 m while being transmitted from a first end fold to the second end fold and then returning to the first end fold.

Two pumping light introducing fibers having a rectangular cross section of 10.0×0.2 mm are inserted into both end surfaces of the bundle portion, thus making four fibers in total, which are arranged along a spiral configuration of a metallic jig (having a base material of brass) comprising a spiral groove of a 1×1 mm rectangular cross section without an end at the center, and pure gold plated surface (mirror surface) which is further coated with transparent fluorocarbon polymer having a refractive index of 1.34.

The index matching oil having a refractive index of 1.458 is introduced into the metallic jig at a flow rate of 0.1 liter/min. The laser fiber located outside the pumping light introducing portion is coated with a transparent fluorocarbon polymer having a refractive index of 1.34, and pumping light introducing fiber is coated with transparent ultraviolet setting resin having a refractive index of 1.445. One end of the laser fiber is connected to an optical signal source of 1.064 µm wavelength so as to input an optical signal of −10 dBm from its end surface. Here, the laser fiber is not connected to a reflection mirror.

Each end (four locations) of the pumping light introducing fiber is connected via a cylindrical lens to a semiconductor laser with an oscillation wavelength of about 0.8 µm, and a maximum output power of 200 W, thereby to introduce pumping light into the bundle portion. An amplified optical signal is observed having a wavelength of 1.064 µm and output power of 55 dBm. This optical fiber amplifier can be used in optical communication between artificial satellites in space.

Figure 17:
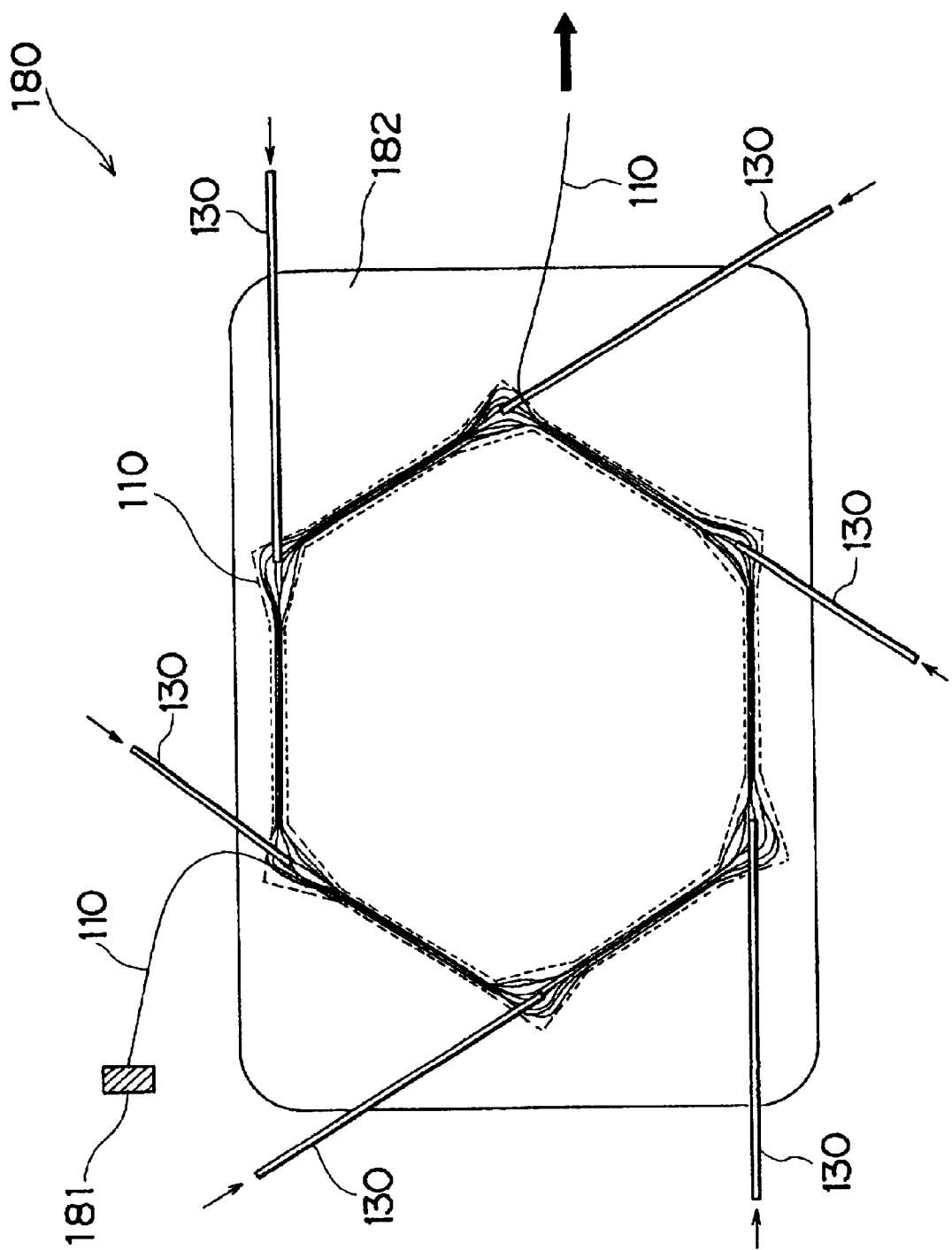
FIG. 17 is a schematic view showing an overall construction of a laser device according to an eleventh embodiment.

Hereinafter, an eleventh embodiment of the invention is described referring to FIG. 17. FIG. 17 shows a construction of a laser device 180 of the eleventh embodiment.

The fiber laser 180 of the eleventh embodiment is a modification of the laser device 101 of the sixth embodiment, and comprises: a metallic jig 182 which is plated with gold or other suitable material and is further coated with a transparent polymer such as fluorocarbon polymer; the pumping light introducing fibers 130; the laser fiber 110; and a reflection mirror 181.

A guide groove forming edges of a hexagon on the metallic jig 182 is provided on the metallic jig 182, and along the edges the laser fiber 110 is provided. The laser fiber 110 is wound along the edges of the hexagon a plurality of times and both terminal ends are drawn to the exterior of the metallic jig 182. Here, the drawn out portion from the metallic jig 182 is provided with a second cladding. A reflection mirror 181 is attached to one end surface of the laser fiber 110 which is drawn outside. The guide groove forming edges of a hexagon is supplied with an index matching oil to fill the space around the laser fiber 110.

Each of the grooves forming edges of a hexagon, as described above, is extended to make a communicating groove to communicate to the exterior of the metallic jig 182, and this communicating groove communicates the groove on the edge to exterior of the metallic jig 182. Along each groove so combined is arranged the pumping light introducing fiber 130, which introduces pumping light into the laser fiber 110 within the metallic jig 182.

A laser beam generated by the introduced pumping light is transmitted to both ends of the laser fiber 110. The laser beam having reached the end of the laser fiber 110 with the reflection mirror 181 is reflected therefrom to finally reach the other end of the laser fiber 110 without the reflection mirror 181 to be output therefrom.

Next, a first example of the eleventh embodiment is described. In the eleventh embodiment, a single silica based glass fiber having a 50 µm core diameter; a 125 µm cladding diameter; and a numerical aperture of 0.2, in which $Nd^{3+}$ ions of 0.4 at % are doped into the core, is encased in a metallic jig (having a base material of brass) of a diameter of about 380 mm and an interior surrounding configuration having a pure gold plated surface (mirror surface) which is further coated with a transparent fluorocarbon polymer having a refractive index of 1.34, to which six pumping light introducing fibers are inserted from a tangential direction at every 200 mm along an outer peripheral of the metallic jig. A laser fiber having a total length of 85 m is used in which 146 cores exist in a cross sectional direction.

Transparent index matching oil having a refractive index of 1.485 is supplied into the metallic jig which is then firmly closed by a lid having a mirror gold plated surface coated with a fluorocarbon polymer having a refractive index of 1.34. Thus assembled laser body is housed in a casing also including an index matching oil having a refractive index of 1.458 and is degassed as a whole to extract air bubbles.

All of the terminal ends of the pumping light introducing fiber and laser fiber are drawn out from the casing. A mirror for reflecting 99% of a 1.06 µm wavelength light is attached to one end of the laser fiber and the other end of the laser fiber remained a broken cut surface.

Each end of the pumping light introducing fiber (six locations) is connected via a cylindrical lens to a semiconductor laser with an oscillation wavelength of about 0.8 µm, and a maximum output power of 35 W, thereby to introduce pumping light into the bundle portion. Laser oscillation is observed to be output having 100 W of power in a 1.06 µm wavelength band.

Next, a second example of the eleventh embodiment is described. Fifteen surrounding metallic portions (including fiber) of the laser device of the first example are prepared and housed in a deep metallic casing in which index matching oil is circulated. Here, laser fibers for 15 metallic portions are fused to be connected in series.

Ninety pumping light introducing fibers and two ends of the laser fiber are drawn out. Each of one end of ninety pumping light introducing fibers is connected via a cylindrical lens to a semiconductor laser with an oscillation wavelength of about 0.8 µm, and a maximum output power of 35 W, thereby to introduce pumping light into the laser device. The other end of the laser fiber is pressed against a mirror having a reflectance of 99.9%. A laser oscillation is observed to be output having 1.3 kW of power in a 1.06 µm wavelength band.

Hereinafter, a third example of the eleventh embodiment is described. In the eleventh embodiment, a single $SiO_2$—$Al_2O_3$—$Y_2O_3$—MgO glass fiber having a 10 µm core diameter; a 125 µm cladding diameter; and a numerical aperture of 0.11, in which $Er^{3+}$ ions of 5000 ppmwt are doped into the core is used. A metallic jig is made of a base material of brass and has an interior surrounding configuration having a pure gold plated surface (mirror surface) which is further coated with a transparent fluorocarbon polymer having a refractive index of 1.34. A diameter of the metallic jig is approximately 380 mm, and a laser fiber having a total length of 120 m is wound in a hexagonal groove in the metallic jig in which 90 cores exist in a cross sectional direction.

Six pumping light introducing fibers having a diameter of 600 µm are inserted from a tangential direction at every 200 mm along an outer peripheral of the metallic jig. Transparent index matching oil having a refractive index of 1.55 is supplied into the metallic jig which is then firmly closed by a lid having a mirror gold plated surface coated with a fluorocarbon polymer having a refractive index of 1.34. Thus assembled laser body is housed in a casing also including an index matching oil having a refractive index of 1.55 and is degassed as a whole to extract air bubbles.

All of the terminal ends of the pumping light introducing fiber and laser fiber are drawn out from the casing. One end of the laser fiber is coupled to a wavelength multiplexing signal source, and the other end of the laser fiber is polished obliquely at 10 degrees. One end of the pumping light introducing fibers is coupled to a semiconductor laser having an oscillation wavelength approximately 0.98 µm and a maximum output of 0.25 W, thereby to introduce pumping light into the bundle portion. As a result, an output signal of 30 dBm is observed in total. Also, by alternating the intensity of 6 pumping sources, a shape of the amplified output spectrum could be controlled in the wavelength multiplexing mode.

Figure 18:
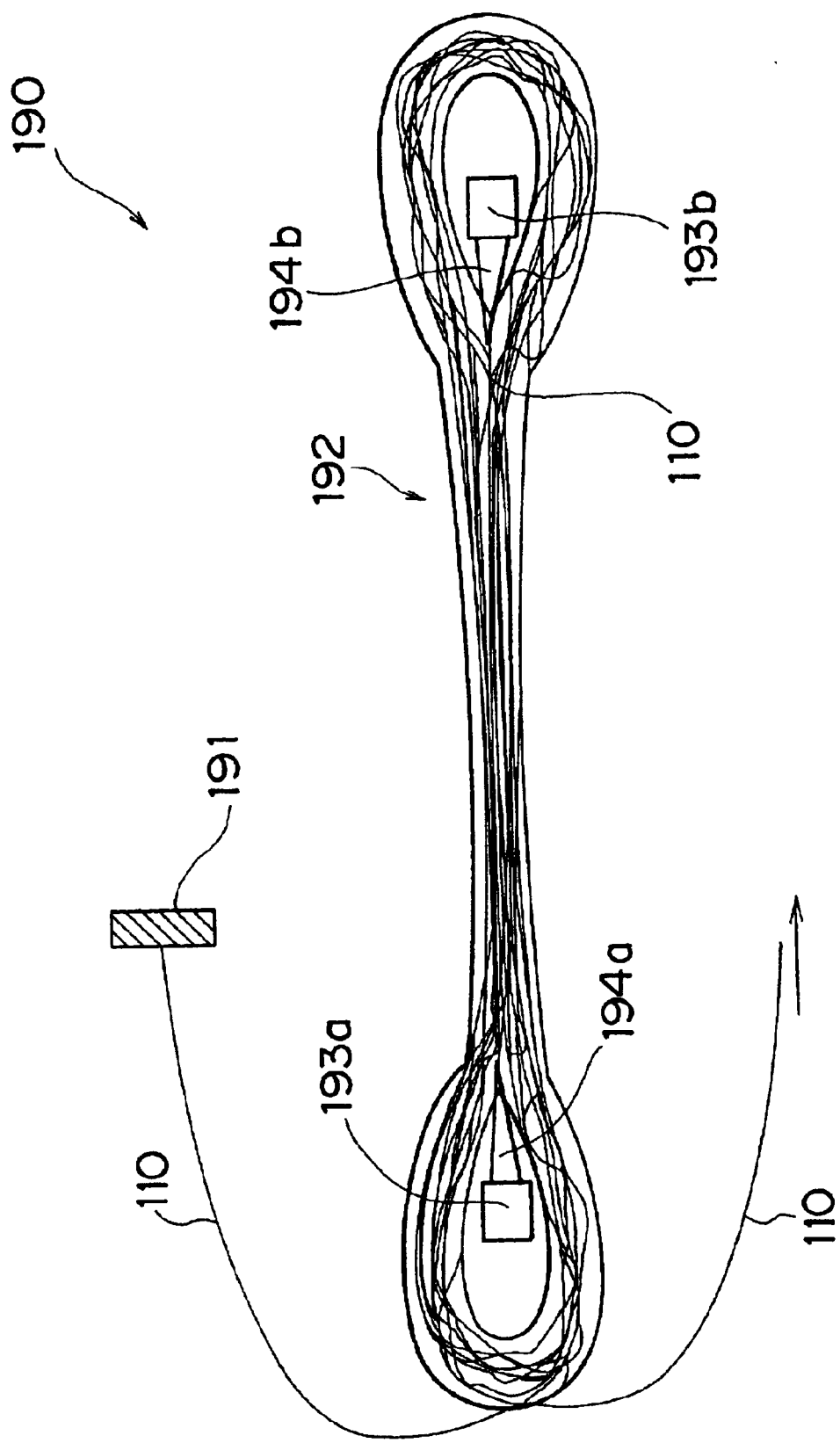
FIG. 18 is a schematic view showing an overall construction of a laser device according to a twelfth embodiment.

Next, a twelfth embodiment of the present invention is described referring to FIG. 18. In the twelfth embodiment, introduction of pumping light is directly performed by pumping LDs and not by a fiber, as in the previously described embodiments. In this embodiment, the pumping LD is applied as a modification of the eighth embodiment.

FIG. 18 shows a construction of a laser device 190 of the twelfth embodiment. As shown in FIG. 18, the laser device 190 comprises: a single laser fiber 110; a reflection mirror 191; pumping LDs 193a, 193b; and pumping light introducing elements 194a, 194b, and as in the eighth embodiment, a folded laser fiber 110 is fused and bundled in a bundle portion 192. The bundle portion 192 and laser fiber 110 located outside the bundle portion 192 is coated with a transparent polymer such as fluorocarbon polymer and further plated with gold or other suitable material.

At both ends of the bundle portion 192, pumping light introducing elements 194a, 194b are attached and pumping LDs 193a, 193b are attached to the pumping light introducing elements 194a, 194b. The pumping light is emitted from the pumping LDs 193a, 193b and is irradiated into the bundle portion 192 via the pumping light introducing elements 194a, 194b such as lensing duct. Other operation is the same as the eighth embodiment and, therefore, the description thereof is omitted.

Next, an example of the twelfth embodiment is described. In the twelfth embodiment, a silica based glass fiber having a 80 µm core diameter; a 125 µm cladding diameter; and a numerical aperture of 0.2, in which $Nd^{3+}$ ions of 0.4 at % are doped into the core, is used. The fiber having a total length of 60 m is folded 146 times so that bundle portion length is 200 mm. By folding the fiber in this manner, light travels 800 mm while being transmitted from a first end fold to the second end fold and then returning to the first end fold. The pumping light introducing elements, having a taper portion of a cross section of 10.0×0.2 mm and length of 60 mm are inserted to both end surfaces of the bundle portion. The whole assembly is placed in the carbon mold and installed inside a vacuum fusion furnace to be heated to 1600° C. for 30 min. Then, helium gas is introduced within the furnace while maintaining the temperature to raise the pressure to 0.2 Mpa, thereby to deflate spaces otherwise existing between fibers.

After cooling, a transparent fluorocarbon polymer having a refractive index of 1.33 is applied to the whole body, and the overall bundle portion is coated with a gold-mercury amalgam to be heated in a vacuum vessel at 200° C. to remove the mercury and to plate the gold thereon. The terminal end of the laser fiber is left without being processed to have about 4% Fresnel reflection. One end of the pumping light introducing fiber is connected via a cylindrical lens to a semiconductor laser with an oscillation wavelength of about 0.8 µm, and a maximum output power of 200 W, thereby to introduce pumping light into the bundle portion. Laser oscillation output is observed having 55 W of power in a 1.06 µm wavelength band. Pumping light introducing optical elements are coupled to a semiconductor laser, using an optical adhesives with an oscillation wavelength of about 0.8 µm, and a maximum output power of 200 W, thereby to introduce pumping light into the bundle portion. Laser oscillation output is observed having 120 W of power in a 1.06 µm wavelength band.

Figure 19:
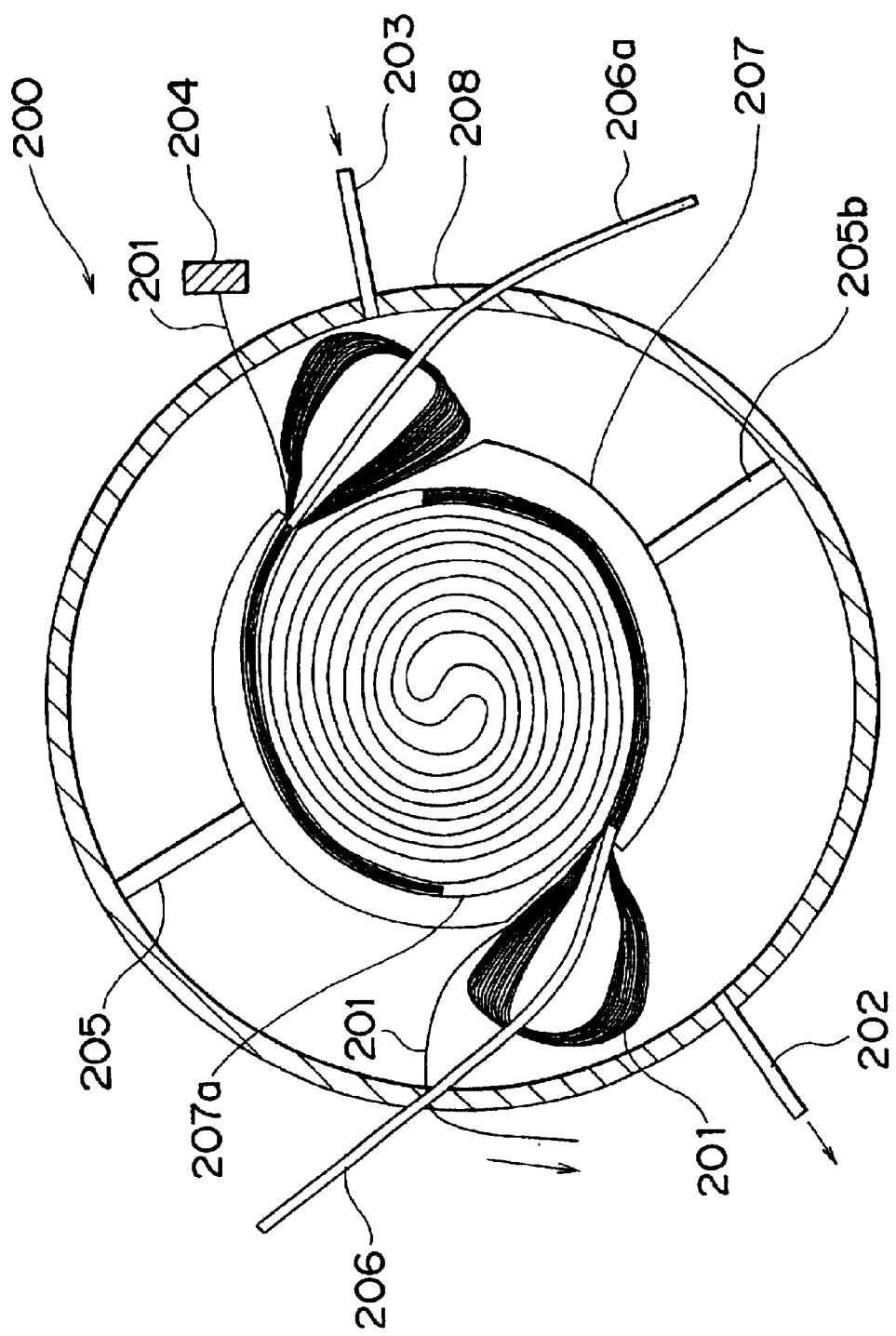
FIG. 19 is a schematic view showing an overall construction of a laser device according to a thirteenth embodiment.

Hereinafter, a thirteenth embodiment of the invention is described by referring to FIG. 19. FIG. 19 shows construction of a laser device 200 of the thirteenth embodiment.

The laser device 200 of the embodiment comprises: a metallic base 207 which is plated with gold or other suitable substance and is further coated with transparent polymer such as fluorocarbon polymer, a discharging port 202; an introducing port 203; a reflection mirror 204; separation walls 205a, 205b; pumping light introducing fibers 206a, 206b; and metallic jig 208.

Laser fiber 201 is bundled after being folded at plural locations to form bundles of folded fibers. The metallic base 207 is provided with a guide groove 207a which does not have a terminal end at the center, and the bundle of the folded fibers are arranged along the guide groove 207a. Here, folded portions and both terminal ends of the laser fiber 201 are drawn through the two exit portions and are located outside the metallic base 207. Reflection mirror 204 is attached to one end surface of the laser fiber 201 which is drawn outside. Tip portions of the pumping light introducing fibers 206a, 206b are connected to two exit portions of the guide groove 207a, thereby to introduce pumping light therein.

As described above, metallic base 207 comprising the laser fiber 201 and the pumping light introducing fibers 206a, 206b is install within a metallic jig 208. One end of the pumping light introducing fibers 206a, 206b unconnected to the metallic base 207 is located outside the metallic jig 208. Also, two separation walls 205a, 205b are attached to abut with the inner surface of the metallic jig 208 and metallic base 207, thereby to divide the space between the inner surface of the metallic jig 208 and outer surface of the metallic base 207 into two regions. One of the regions is attached with an introducing port 203 and the other is attached with a discharging port 202. The index matching oil introduced inside the metallic jig 208 from the introducing port 203 fills one of the regions of the space surrounded by metallic jig 208 and metallic base 207 and separated by the separation walls 205a, 205b, and then flows through inside the metallic base 207 to reach the other region separated by the separation walls 205a, 205b. Thereafter, index matching oil fills the other region and then is discharged from the discharging port 202.

The pumping light introduced by the pumping light introducing fiber 206a, 206b is repeatedly reflected within the metallic base 207 to reach the laser fiber 201 and the laser fiber 201 irradiated by the pumping light generates a laser beam. The generated laser beam is transmitted to both ends of the laser fiber 201. The laser beam having reached an end without a reflection mirror 206 will be output therethrough, and the laser beam having reached the end with the reflection mirror 206 is reflected therefrom to be output from the other end.

Next, an example of the thirteenth embodiment is described. In this example, a laser device is used as an optical signal amplifier. In the thirteenth embodiment, a silica based glass fiber having a 7 µm core diameter; a 60 µm cladding diameter; and a numerical aperture of 0.11, in which $Nd^{3+}$ ions of 0.4 at % are doped inside the core, is used. The fiber having a total length of 610 m is folded 240 times so that bundle portion length is 2.0 m. By folding the fiber in this manner, light travels 2.5 m while being transmitted from a first end fold to the second end fold and then returning to the first end fold.

Two pumping light introducing fibers having a rectangular cross section of 10.0×0.1 mm are inserted into each of both end surfaces of the bundle portion, thus making four fibers in total, which are arranged along a spiral configuration of a metallic jig comprising a spiral groove without an end at the center. The metallic jig had a base material of brass, and mirror-like pure gold plated surface is formed which is further coated with transparent fluorocarbon polymer of refractive index of 1.34.

The laser fiber located outside the pumping light introducing port is coated with a transparent fluorocarbon polymer of having an refractive index of 1.34, and pumping light introducing fiber is coated with transparent ultraviolet setting resin having a refractive index of 1.445.

Index matching oil of 1.458 refractive index is introduced into the metallic jig at a flow rate of 0.1 litter/min. One end of the laser fiber is connected to an optical signal source having a wavelength of 1.064 μm so as to input an optical signal of −10 dB. The pumping light introducing fiber is connected via a cylindrical lens to a semiconductor laser with an oscillation wavelength of about 0.8 μm, and a maximum output power of 200 W, thereby to introduce pumping light into the bundle portion. Amplified optical signal is observed having a wavelength of 1.064 μm and output power of 55 dB. This optical fiber amplifier can be used in optical communication between artificial satellites in space.

In the above description, the embodiments are described mainly as a laser device for generating a laser beam, however, the present invention can be used as an optical signal amplifier in which the reflection mirror attached to the laser fiber is eliminated.

Also, in the above explanation, the laser fiber has a circular or quadrangle cross section, however, laser fibers of other configuration can be used, such as rectangle, D-shape or barrel-shape.

Further, the present invention is not limited to these embodiments, but various variations and modifications may be made without departing from the scope of the present invention.

What is claimed is:

1. A laser device for generating a laser beam by supplying a pumping light to a laser medium contained in an optical fiber comprising:

an optical fiber having a core portion in which said laser medium is added and a cladding portion covering said core portion, a fluid medium having a refractive index substantially identical to said cladding portion at a wavelength of said pumping light, a pumping light reflecting portion having an interior reflective surface defining an inner space filled with said fluid medium, the inner space being substantially surrounded by said reflective surface, and the inner space containing at least a part of said optical fiber thereby to confine said pumping light interiorly thereof, and a pumping light introducing port for introducing said pumping light into said pumping light reflecting portion, wherein the pumping light enters said core portion through said cladding portion, and wherein said pumping light reflecting portion comprises a part of a passage for said fluid medium.

2. A laser device according to claim 1, wherein said fluid medium circulates through said pumping light reflecting portion.

3. A laser device according to claim 1, wherein said fluid medium is a coolant for cooling said optical fiber and said pumping light introducing port.

4. A laser device according to claim 1, wherein said optical fiber comprises a material selected from the group consisting of silica glass, fluoride glass, fluorophosphate glass, chalcogenide glass, oxychalcogenide glass, phosphate glass, telluride glass, borate glass, multicompound aluminosilicate glass and plastic.

5. A laser device according to claim 1, wherein said laser medium is selected from the group consisting of $Nd^{3+}$, $Yb^{3+}$, $Er^{3+}$, $Pr^{3+}$, $Cd^{3+}$, $TM^{3+}$, $Ho^{3+}$, $Ho^{3+}$, $Ho^{3+}$, $Tb^{3+}$, $Dy^{3+}$, $Eu^{3+}$, $Eu^{2+}$ and organic dye.

6. An optical signal amplifier for amplifying an optical signal by supplying a pumping light to a laser medium contained in an optical fiber comprising:

an optical fiber having a core portion in which said laser medium is doped and a cladding portion covering said core portion, a fluid medium having a refractive index substantially identical to said cladding portion at a wavelength of said pumping light, a pumping light reflecting portion having an interior reflective surface defining an inner space filled with said fluid medium, the inner space being substantially surrounded by said reflective surface, and the inner space containing at least a part of said optical fiber thereby to confine said pumping light interiorly thereof, and a laser beam introducing port for introducing said pumping light into said pumping light reflecting portion, wherein the pumping light enters said core portion through said cladding portion, and wherein said pumping light reflecting portion comprises apart of a passage for said fluid medium.

7. A laser device for generating a laser beam by supplying a pumping light to an optical fiber, said optical fiber having a core in which a laser medium is doped and a cladding covering said core, said laser device comprising:

an optical fiber bundle in which at least two discontinuous segments of an optical fiber forming at least one optical path are bundled, a pumping light introducing portion for introducing pumping light for pumping said laser medium in said optical fiber, said pumping light introducing portion being bundled together with said optical fiber in said optical fiber bundle, a fluid medium having a refractive index substantially identical to the cladding at a wavelength of the pumping light, a pumping light reflection portion having an interior reflective surface defining an inner space filled with said fluid medium, the inner space covering at least a part of a side surface of said optical fiber bundle for repeatedly reflecting the pumping light so that said pumping light is absorbed in said laser medium, and a laser output portion for outputting a laser beam generated by said laser medium pumped by said pumping light.

8. A laser device according to claim 7, wherein a space inside said pumping light reflection portion is filled with a medium having a refractive index substantially the same as a refractive index of said cladding of said optical fiber.

9. A laser device according to claim 7, wherein a space inside said optical fiber bundle is filled with a cooling medium to cool said optical fiber bundle.

10. A laser device according to claim 7, wherein said optical fiber comprises a material selected from the group consisting of silica glass, fluoride glass, fluorophosphate glass, chalcogenide glass, oxychalcogenide glass, phosphate glass, telluride glass, borate glass, multicompound aluminosilicate glass and plastic.

11. A laser device according to claim 7, wherein said laser medium is selected from the group consisting of $Nd^{3+}$, $Yb^{3+}$, $Er^{3+}$, $Pr^{3+}$, $Ce^{3+}$, $Tm^{3+}$, $Ho^{3+}$, $Tb^{3+}$, $Tb^{3+}$, $Dy^{3+}$, $Eu^{3+}$, $Eu^{2+}$ and organic dye.

12. An optical signal amplifier for amplifying an optical signal by using an optical fiber, said optical fiber having a core in which a laser medium is doped and a cladding covering said core, said optical signal amplifier comprising:

an optical fiber bundle in which at least two discontinuous segments of an optical fiber forming at least one optical path are bundled, a pumping light introducing portion for introducing pumping light for pumping said laser medium in said optical fiber bundle, said pumping light introducing portion being bundled together with said optical fiber bundle, a fluid medium having a refractive index substantially identical to the cladding at a wavelength of the pumping light, a pumping light reflection portion having an interior reflective surface defining an inner space filled with said fluid medium, the inner space covering at least a part of a side surface of said optical fiber bundle for repeatedly reflecting the pumping light so that said pumping light is absorbed in said laser medium, and an output portion for outputting an optical signal amplified by said laser medium pumped by the pumping light.

13. A laser device according to claim 6, wherein said fluid medium circulates through said pumping light reflecting portion.

14. A laser device according to claim 6, wherein said fluid medium is a coolant for cooling said optical fiber and said pumping light introducing port.

15. A laser device according to claim 6, wherein said optical fiber comprises a material selected from the group consisting of silica glass, fluoride glass, fluorophosphate glass, chalcogenide glass, oxychalcogenide glass, phosphate glass, telluride glass, borate glass, multicompound aluminosilicate glass and plastic.

16. A laser device according to claim 6, wherein said laser medium is selected from the group consisting of $Nd^{3+}$, $Yb^{3+}$, $Er^{3+}$, $Pr^{3+}$, $Cd^{3+}$, $TM^{3+}$, $Ho^{3+}$, $Ho^{3+}$, $Ho^{3+}$, $Tb^{3+}$, $Dy^{3+}$, $Eu^{3+}$, $Eu^{2+}$ and organic dye.

17. A laser device according to claim 12, wherein a space inside said pumping light reflection portion is filled with a medium having a refractive index substantially the same as a refractive index of said cladding of said optical fiber.

18. A laser device according to claim 12, wherein a space inside said optical fiber bundle is filled with a cooling medium to cool said optical fiber bundle.

19. A laser device according to claim 12, wherein said optical fiber comprises a material selected from the group consisting of silica glass, fluoride glass, fluorophosphate glass, chalcogenide glass, oxychalcogenide glass, phosphate glass, telluride glass, borate glass, multicompound aluminosilicate glass and plastic.

20. A laser device according to claim 12, wherein said laser medium is selected from the group consisting of $Nd^{3+}$, $Yb^{3+}$, $Er^{3+}$, $Pr^{3+}$, $Ce^{3+}$, $Tm^{3+}$, $Ho^{3+}$, $Tb^{3+}$, $Tb^{3+}$, $Dy^{3+}$, $Eu^{3+}$, $Eu^{2+}$ and organic dye.

* * * * *

UNITED STATES PATENT AND TRADEMARK OFFICE
CERTIFICATE OF CORRECTION

PATENT NO. : 6,795,460 B1
DATED : September 21, 2004
INVENTOR(S) : Itoh

It is certified that error appears in the above-identified patent and that said Letters Patent is hereby corrected as shown below:

Title page,
Insert Item:
-- [30]         Foreign Application Priority Data
          March 17, 1999   [JP]   Japan    JP 11-71677
          March 17, 1999   [JP]   Japan    JP 11-71678
          May 25, 1999     [JP]   Japan    JP 11-144332
          May 27, 1999     [JP]   Japan    JP 11-147812 --

Signed and Sealed this

Eighth Day of February, 2005

JON W. DUDAS
*Director of the United States Patent and Trademark Office*